(12) United States Patent
Shapiro et al.

(10) Patent No.: US 12,189,363 B2
(45) Date of Patent: Jan. 7, 2025

(54) THERMAL MODELING FOR COMPUTER NUMERICALLY CONTROLLED FABRICATION

(71) Applicant: Glowforge Inc., Seattle, WA (US)

(72) Inventors: Daniel Shapiro, Mercer Island, WA (US); Mark Gosselin, Seattle, WA (US); Nicodemus Paradiso, Seattle, WA (US); Penelope Ackerman, Seattle, WA (US); Rachael Ludwick, Seattle, WA (US); Will Simons, Seattle, WA (US); John Peter Tapsell, Tokyo (JP)

(73) Assignee: Glowforge, Inc., Seattle, WA (US)

( * ) Notice: Subject to any disclaimer, the term of this patent is extended or adjusted under 35 U.S.C. 154(b) by 0 days.

(21) Appl. No.: 17/106,032

(22) Filed: Nov. 27, 2020

(65) Prior Publication Data

US 2022/0171366 A1 Jun. 2, 2022

(51) Int. Cl.
*G05B 19/4099* (2006.01)
*G05B 13/04* (2006.01)
*G05B 19/418* (2006.01)

(52) U.S. Cl.
CPC ....... *G05B 19/4099* (2013.01); *G05B 13/041* (2013.01); *G05B 19/41885* (2013.01); *G05B 2219/41354* (2013.01); *G05B 2219/49023* (2013.01)

(58) Field of Classification Search
CPC .................. G05B 13/041; G05B 19/41885
See application file for complete search history.

(56) References Cited

U.S. PATENT DOCUMENTS

| | | | |
|---|---|---|---|
| 8,412,588 B1 | 4/2013 | Bodell et al. | |
| 10,245,788 B1* | 4/2019 | Susnjara | B29C 64/236 |
| 2016/0309548 A1* | 10/2016 | Libman | H05B 6/6455 |
| 2018/0314235 A1 | 11/2018 | Mirabella et al. | |
| 2019/0079493 A1 | 3/2019 | Yang et al. | |
| 2020/0147868 A1* | 5/2020 | Gold | B22F 10/20 |

(Continued)

FOREIGN PATENT DOCUMENTS

| | | |
|---|---|---|
| EP | 3722083 A1 | 10/2020 |
| WO | 2016131018 A1 | 8/2016 |

*Primary Examiner* — Robert E Fennema
*Assistant Examiner* — Yvonne Trang Follansbee
(74) *Attorney, Agent, or Firm* — Lee Sullivan Shea & Smith LLP

(57) ABSTRACT

A method for computer numerically controlled processing may include receiving configurations for a fabrication in which a computer numerically controlled machine processes a material to achieve one or more designs. An analysis may be performed to determine whether a thermal event occurs during the fabrication. The analysis may include performing one or more of a time-variant simulation and a time-invariant simulation of the fabrication. The thermal event may include one or more regions of the material exhibiting an undesirable response to the electromagnetic energy delivered to the material. One or more outputs may be generated based on the result of the thermal verification. The outputs may include a visualization of the quantity of energy exposure across the material, an alert if a thermal event is determined to occur during the fabrication, and corrective actions for resolving potential thermal events.

18 Claims, 18 Drawing Sheets

(56) References Cited

U.S. PATENT DOCUMENTS

| | | | |
|---|---|---|---|
| 2022/0057789 A1* | 2/2022 | Kitaoka | G05B 19/41885 |
| 2022/0066426 A1* | 3/2022 | Czinger | B22F 12/90 |
| 2023/0211432 A1* | 7/2023 | Steinberg | B23K 9/0953 |
| | | | 219/76.14 |

* cited by examiner

US 12,189,363 B2

THERMAL MODELING FOR COMPUTER NUMERICALLY CONTROLLED FABRICATION

TECHNICAL FIELD

The subject matter described herein relates generally to computer numerically controlled fabrication and more specifically to computer numerically controlled fabrication aided with thermal modeling.

BACKGROUND

Computer controlled manufacturing systems, such as "3-D printers," laser cutter/engravers, computer numerically controlled milling machines, and the like, can be used to create complicated items where traditional manufacturing techniques like moldings or manual assembly fail. Such automated methods operate based on instructions that specify the cuts, engravings, patterns, and other actions to be performed. The instructions can be in the form of computer files transferred to the memory of a computer controller for the machine and interpreted at run-time to provide a series of steps in the manufacturing process.

SUMMARY

Systems, methods, and articles of manufacture, including apparatuses, are provided for computer numerically controlled fabrication aided with thermal modeling. In one aspect, there is provided a system that includes at least one data processor and at least one memory. The at least one memory may store instructions that cause operations when executed by the at least one data processor. The operations may include: receiving one or more configurations for a fabrication in which a computer numerically controlled machine processes a material to achieve one or more designs, the processing of the material includes delivering an electromagnetic energy configured to effect, in the material, one or more changes corresponding to the one or more designs, the one or more configurations including a design file corresponding to the one or more designs, one or more characteristics of the material, and one or more settings of the computer numerically controlled machine; performing an analysis of the one or more configurations to determine a likelihood of a thermal event occurring during the fabrication, the thermal event including one or more regions of the material exhibiting an undesirable response to the electromagnetic energy delivered to the material; and generating, based at least on a result of the analysis, one or more outputs.

In some variations, one or more of the features disclosed herein including the following features can optionally be included in any feasible combination. The analysis may include performing one or more simulations of the processing of the material. The one or more simulations may be performed to determine a cumulative quantity of energy exposure across the material and/or a quantity of energy exposure across the material at successive points in time during the processing of the material.

In some variations, a calibration fabrication may be performed to determine a value of at least one parameter of the one or more simulations. The calibration fabrication may enable a determination of how the material responds to the processing of the material. The calibration fabrication may be performed on the material and/or a different piece of a same or similar material.

In some variations, the at least one parameter may be determined based on one or more images of the material subsequent to the calibration fabrication, one or more characteristics of the design used for the calibration fabrication, the one or more settings of the computer numerically controlled machine, the one or more characteristics of the material, and/or a user input identifying a region of the material as exhibiting the undesirable response subsequent to the calibration fabrication.

In some variations, the analysis may include determining whether a surface area of the material and/or changes to the surface area of the material as a result of the processing increases the likelihood of the thermal event.

In some variations, the undesirable response to the electromagnetic energy may be determined automatically and/or based on a user input.

In some variations, the analysis may be performed at the computer numerically controlled machine, a client device communicatively coupled with the computer numerically controlled machine, and/or a server communicatively coupled with the computer numerically controlled machine.

In some variations, one or more characteristics of the material may be identified based at least on a user input, an identifier associated with the material, and/or data from one or more sensors at the computer numerically controlled machine.

In some variations, the one or more outputs may include one or more visual indicators identifying the one or more regions of the material exhibiting the undesirable response to the electromagnetic energy delivered to the material.

In some variations, the one or more outputs may include one or more visual indicators identifying one or more portions of the design file associated with the one or more regions of the material exhibiting the undesirable response to the electromagnetic energy delivered to the material.

In some variations, the one or more outputs may include recommending and/or automatically triggering a corrective action. The corrective action may include modifying at least one of the design files, the one or more characteristics of the material, and the one or more settings of the computer numerically controlled machine.

In some variations, the one or more outputs may include commanding the computer numerically controlled machine to start the fabrication in response to determining that the likelihood of the thermal event occurring is below a threshold value. The computer numerically controlled machine may be commanded to start the fabrication without notifying a user of the result of the analysis.

In some variations, the analysis may be performed automatically in response to a user input to begin the fabrication.

In another aspect, there is provided a method for computer numerically controlled fabrication aided with thermal modeling that includes: receiving one or more configurations for a fabrication in which a computer numerically controlled machine processes a material to achieve one or more designs, the processing of the material includes delivering an electromagnetic energy configured to effect, in the material, one or more changes corresponding to the one or more designs, the one or more configurations including a design file corresponding to the one or more designs, one or more characteristics of the material, and one or more settings of the computer numerically controlled machine; performing an analysis of the one or more configurations to determine a likelihood of a thermal event occurring during the fabrication, the thermal event including one or more regions of the material exhibiting an undesirable response to the electromagnetic energy delivered to the material; and generating, based at least on a result of the analysis, one or more outputs.

In some variations, one or more of the features disclosed herein including the following features can optionally be included in any feasible combination. The method may further include: performing a calibration fabrication to determine a value of at least one parameter of one or more simulations of the processing of the material, the calibration fabrication enabling a determination of how the material responds to the processing of the material, the calibration fabrication being performed on the material and/or a different piece of a same or similar material, and the at least one parameter being determined based on one or more images of the material subsequent to the calibration fabrication, the one or more settings of the computer numerically controlled machine, the one or more characteristics of the material, and/or a user input identifying a region of the material as exhibiting the undesirable response subsequent to the calibration fabrication; and performing the one or more simulations to determine a cumulative quantity of energy exposure across the material and/or a quantity of energy exposure across the material at successive points in time during the processing of the material.

In some variations, the method may further include: identifying, based at least on a user input, an identifier associated with the material, and/or data from one or more sensors at the computer numerically controlled machine, the one or more characteristics of the material.

In some variations, the one or more outputs may include recommending and/or automatically triggering a corrective action. The corrective action may include modifying at least one of the design file, the one or more characteristics of the material, and the one or more settings of the computer numerically controlled machine.

In some variations, the one or more outputs may include commanding the computer numerically controlled machine to start the fabrication in response to determining that the likelihood of the thermal event occurring is below a threshold value. The computer numerically controlled machine may be commanded to start the fabrication without notifying a user of the result of the analysis.

In some variations, the analysis may be performed automatically in response to a user input to begin the fabrication.

In another aspect, there is provided a computer program product including a non-transitory computer readable medium storing instructions. The instructions may result in operations when executed by at least one data processor. The operations may include: receiving one or more configurations for a fabrication in which a computer numerically controlled machine processes a material to achieve one or more designs, the processing of the material includes delivering an electromagnetic energy configured to effect, in the material, one or more changes corresponding to the one or more designs, the one or more configurations including a design file corresponding to the one or more designs, one or more characteristics of the material, and one or more settings of the computer numerically controlled machine; performing an analysis of the one or more configurations to determine a likelihood of a thermal event occurring during the fabrication, the thermal event including one or more regions of the material exhibiting an undesirable response to the electromagnetic energy delivered to the material; and generating, based at least on a result of the analysis, one or more outputs.

Implementations of the current subject matter can include, but are not limited to, methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a computer-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including, for example, a connection over a network (e.g. the Internet, a wireless wide area network, a local area network, a wide area network, a wired network, or the like), via a direct connection between one or more of the multiple computing systems, and/or the like.

The details of one or more variations of the subject matter described herein are set forth in the accompanying block diagrams, flow charts, drawings, and the description below. Other features and advantages of the subject matter described herein will be apparent from the description and drawings, and from the claims. While certain features of the currently disclosed subject matter may be described for illustrative purposes in relation to thermal modeling for automated manufacturing processes such as computer numerically controlled fabrication, it should be readily understood that such features are not intended to be limiting.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

When practical, similar reference numbers denote similar structures, features, or elements.

DETAILED DESCRIPTION

Figure 1:
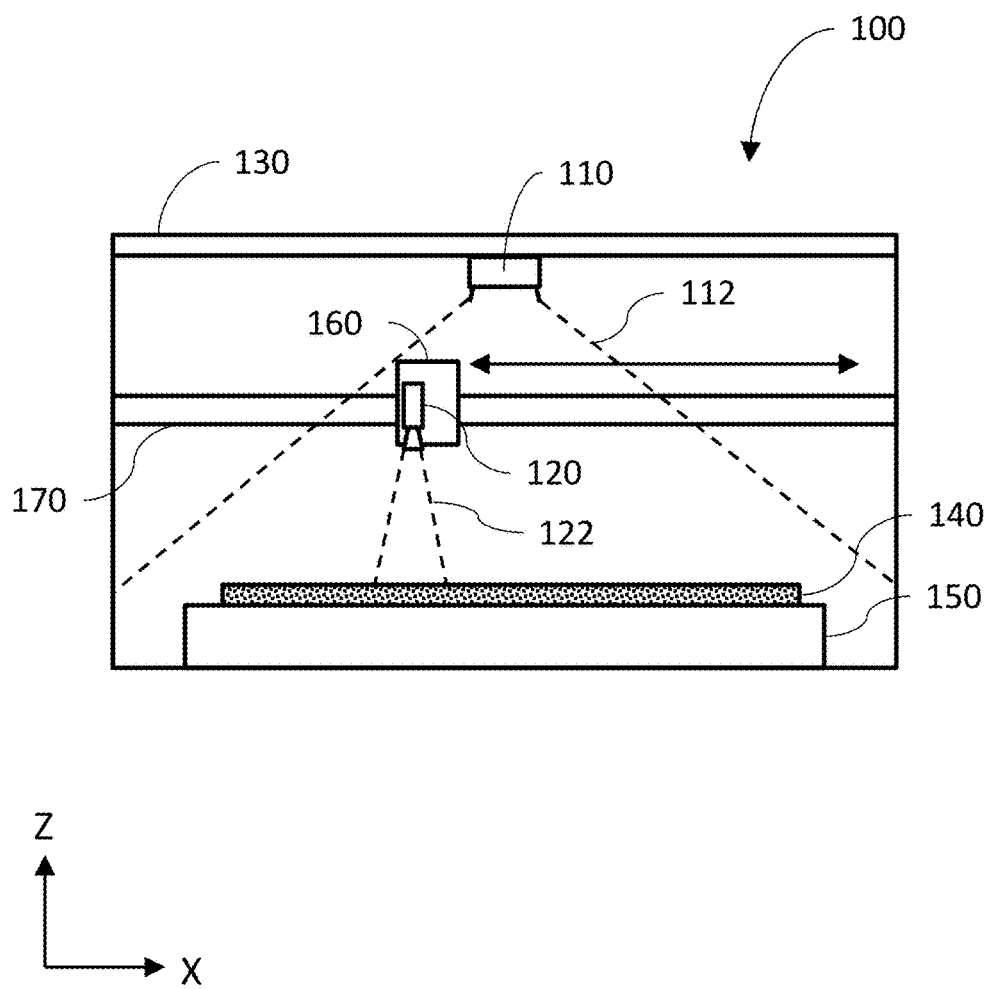
FIG. 1 depicts an elevational view of an example of a computer numerically controlled machine consistent with some implementations of the current subject matter.

A computer numerically controlled machine may include a source configured to emit electromagnetic energy, for example, in the form of a laser. Electromagnetic energy from the source may be routed to a head configured to deliver the electromagnetic energy to a destination such as, for example, one or more portions of a material disposed on top of a material bed and positioned in a working area defined by limits within which the head is commanded to cause delivery of the electromagnetic energy. The head may direct the energy by translating or rotating reflective elements, optical fibers, the laser itself, or any other means of directing the energy. Moreover, the working area may be inside an interior space of the computer numerically controlled machine, which may be defined by a housing including an openable barrier, for example, a lid, a door, a hatch, a flap, and/or the like, that attenuates the transmission of electromagnetic energy between the interior space and an exterior of the computer numerically controlled machine when the openable barrier is in a closed position.

The computer numerically controlled machine may process the material such that the material's appearance subsequent to the processing is consistent with an intended appearance of the material. For example, by delivering electromagnetic energy to one or more portions of the material, the computer numerically controlled machine may effect, in the material, one or more changes (e.g., cuts, engravings, and/or the like) corresponding to one or more user-specified designs. Nevertheless, an incompatibility between the user-specified designs and the characteristics of the material may trigger one or more faults, such as thermal events, during the processing of the material. As used herein, a "thermal event" may refer to a condition in which one or more regions of the material exhibits an undesirable response, for example, as a result of being exposed to an unsuitable or undesirable quantity of electromagnetic energy (e.g., a quantity of electromagnetic energy that fails to satisfy one or more thresholds such as more than a maximum quantity of energy exposure, less than a minimum quantity of energy exposure, and/or the like).

For example, when a thin and/or a low-density material is processed to achieve a design having a dense distribution of cuts, one or more regions of the material may overheat during the processing of the material in response to the electromagnetic energy delivered to the material. Overheating the material is one type of thermal event that may cause hazardous conditions (e.g., smoke, fire, and/or the like) as well as inadvertent damage to the material (e.g., discoloration, char, and/or the like). Under heating may also be an undesirable thermal event at least because the computer numerically controlled machine may fail to achieve the intended final appearance of the material if an insufficient quantity of electromagnetic energy is delivered to one or more regions of the material.

Consequences of thermal events may include cuts that are made too deep, too shallow, and/or too wide (for example, as a result of excessive power). In some cases, a cut that is made too deep may cause an unintentional or undesirable through-cut of the material and generate debris that poses additional fire or smoke hazards. In other cases, a cut that is made too shallow may fail to cut through a material which may produce an undesirable result. Thermal events may also generate smoke, sparks, embers, and even flames. Debris from thermal events may contaminate parts of the material, the computer numerically controlled machine, and/or the surrounding environment. Heat generated by the thermal events may cause damage to the computer numerically controlled machine (e.g., melt a nearby belt and/or the like).

A conventional computer numerically controlled machine may lack a mechanism for proactively preventing thermal events. Instead, the computer numerically controlled machine may detect and respond to thermal events as they occur during the processing of the material. For example, in the event that the computer numerically controlled machine detects excessively high heat within the interior space of the computer numerically controlled machine, the computer numerically controlled machine may interrupt the processing of the material such that one or more corrective actions may be performed. However, interrupting the processing of the material after a thermal event is detected may not be sufficiently timely to avoid damage to the material. Additionally, restarting of processing of the material after the interruption has the potential to result in unwanted discontinuities in the shape and/or appearance of the finished material. Addressing thermal events reactively may therefore diminish user experience at least because the computer numerically controlled machine may process the material with less reliability and more interruptions.

Furthermore, the detection of thermal events during the processing of the material tends to be unreliable. Oftentimes, by the time a thermal event starts and is capable of being detected, the material has already been subject to irrevocable damage. Other times, even if the thermal event itself does not damage the material, the interruption of fabrication to prevent damage may make it impossible to achieve the intended design without causing damage to the material. Whether the damage to the material is a direct or an indirect result of the thermal event, detecting and resolving thermal events reactively increases the risk that some or all of the material may be rendered unusable and/or that damage may occur to the machine and/or its surroundings. A conventional computer numerically controlled machine that relies on a reactive detection mechanism does not afford an opportunity to avoid potential thermal events. By contrast, detecting thermal events proactively, before the computer numerically controlled machine processes the material, may provide an opportunity to perform corrective actions that can mitigate or eliminate potential thermal events. Better user experience is therefore achieved by alerting the user to potential problems in advance instead of during the processing of the material as the thermal events are occurring, at which point it may no longer be possible to perform corrective actions to avoid damage to the material.

As such, in some implementations of the current subject matter, to proactively prevent thermal events, thermal verification may be dynamically performed such that potential thermal events may be predicted before the computer numerically controlled machine processes the material. For example, the computer numerically controlled machine may respond to a "begin fabrication" command from a user by processing the material to achieve one or more user-specified designs. However, prior to processing the material, a thermal verification may be performed in order to assess whether the one or more designs is likely to trigger one or more thermal events during the processing of the material to achieve the designs. This assessment may include determining a likelihood (e.g., a probability and/or the like) of one or more thermal events occurring during the processing of the material. The thermal verification may include analyzing a surface area of the material, as a material with a high surface area is associated with a higher likelihood of ignition. The thermal verification may also consider how each processing step (e.g. a first cut) may affect the likelihood of a thermal event occurring from a subsequent step (e.g. a second cut), either because of repeated applications of heat energy, or because the first cut modified the geometry of the material (e.g. increased its surface area and/or reduced its ability to conductively dissipate thermal energy). Alternatively and/or additionally, a simulation of the fabrication may be performed and one or more visualizations of the quantity of energy exposure across the material may be generated. The likelihood of thermal events occurring during an actual processing of the material, such as the probability that one or more regions of the material overheat and/or under heat, may be determined based on the simulation. An alert may be generated in response to detecting a potential thermal event such that a user may intervene to resolve the potential thermal event. Alternatively and/or additionally, in response to detecting a potential thermal event, one or more recommendations and/or corrective actions for resolving the thermal event may be determined. In some cases, one or more corrective actions to avoid a potential thermal event may be performed automatically such that the likelihood of the thermal event occurring during the subsequent processing of the material is changed without user intervention.

As used herein, the term "cutting" can generally refer to altering the appearance, properties, and/or state of a material. Cutting can include, for example, making a through-cut, engraving, bleaching, curing, burning, discoloring, etc. Engraving, when specifically referred to herein, indicates a process by which a computer numerically controlled machine modifies the appearance of the material without fully penetrating it. For example, in the context of a laser cutter, it can mean removing some of the material from the surface, or discoloring the material, e.g., through an application of focused and/or coherent electromagnetic energy as described below.

As used herein, the term "laser" includes any electromagnetic energy or focused and/or coherent energy source that (in the context of being a cutting tool) uses photons to modify a substrate or cause some change or alteration upon a material impacted by the photons. Lasers (whether cutting tools or diagnostic) can be of any desired wavelength, including for example, microwave, lasers, infrared lasers, visible lasers, UV lasers, X-ray lasers, gamma-ray lasers, or the like.

Also, as used herein, "cameras" includes, for example, visible light cameras, black and white cameras, IR or UV sensitive cameras, individual brightness sensors such as photodiodes, sensitive photon detectors such as a photomultiplier tube or avalanche photodiodes, detectors of infrared energy far from the visible spectrum such as microwaves, X-rays, or gamma rays, optically filtered detectors, spectrometers, and other detectors that can include sources providing electromagnetic energy for illumination to assist with acquisition, for example, flashes, UV lighting, etc.

Also, as used herein, unless otherwise specified, reference to "real-time" actions is intended to include some degree of delay or latency, either programmed intentionally into the actions or as a result of the limitations of machine response and/or data transmission. "Real-time" actions, as used herein, are intended to only approximate an instantaneous response, or a response performed as quickly as possible given the limits of the system, and do not imply any specific numeric or functional limitation to response times or the machine actions resulting therefrom.

Also, as used herein, unless otherwise specified, the term "material" is the material that is on the bed of the computer numerically controlled machine. For example, if the computer numerically controlled machine is a laser cutter, the material is what is placed in the computer numerically controlled machine to be cut, for example, the raw materials, stock, or the like. The computer numerically controlled machine may be a machine that is used to perform subtractive processing (e.g., by removing the material) under the control of a computer, in which case the computer numerically controlled machine may include one or more motors (or other actuators) that move one or more heads performing the removal of the material.

Figure 2:
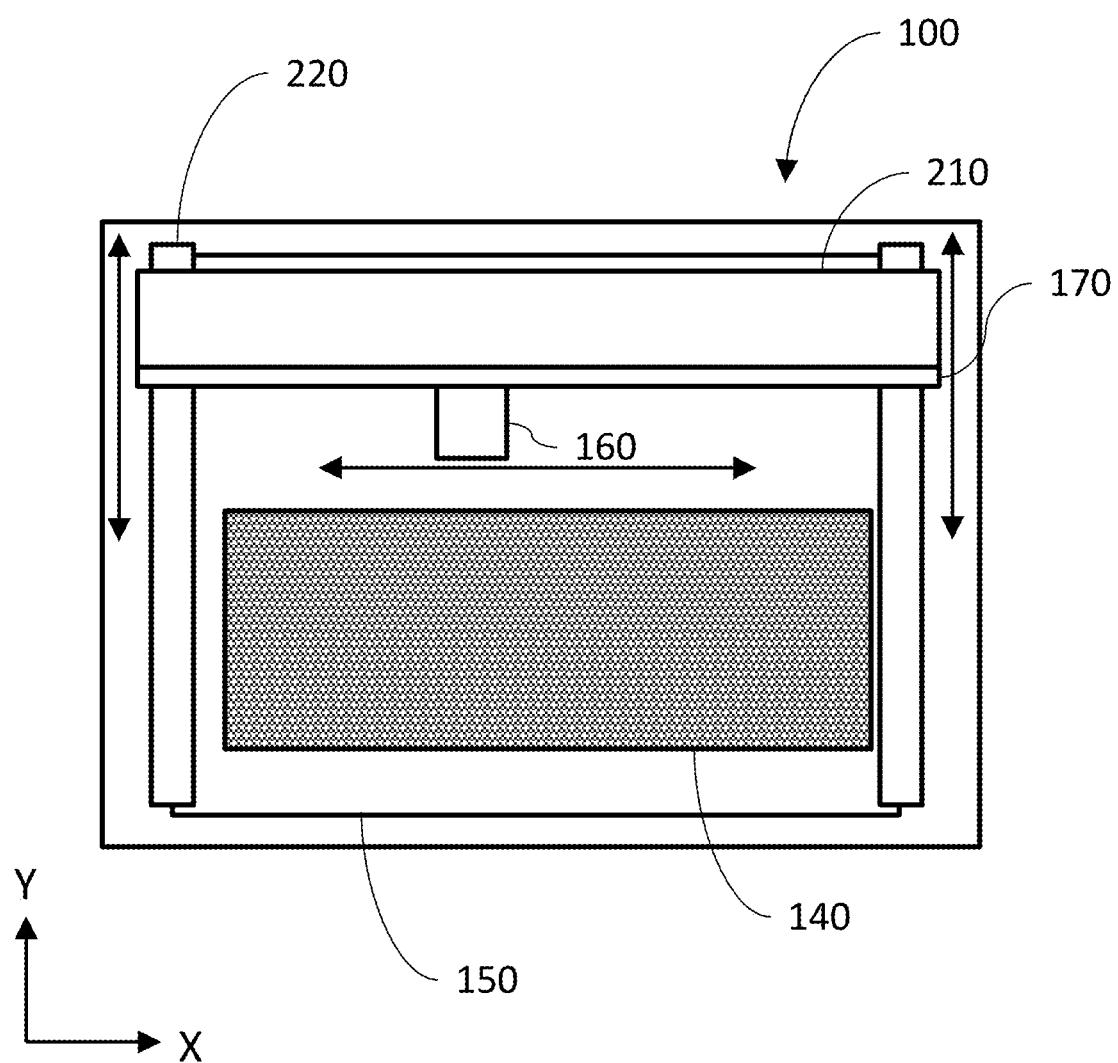
FIG. 2 depicts a top view of an example of a computer numerically controlled machine consistent with implementations of the current subject matter.

FIG. 1 depicts an elevational view of an example of a computer numerically controlled machine 100, consistent with implementations of the current subject matter. The example of the computer numerically controlled machine 100 shown in FIG. 1 may include a camera positioned to capture an image of an entire material bed 150 and another camera positioned to capture an image of a portion of the material bed 150, consistent with some implementations of the current subject matter. FIG. 2 depicts a top view of the example of the computer numerically controlled machine 100 shown in FIG. 1.

In some implementations of the current subject matter, the computer numerically controlled machine 100 may be a laser cutter/engraver that uses electromagnetic energy (e.g., laser) to perform various forms of subtractive processing including, for example, cutting, engraving, and/or the like. While some features are described herein in the context of a laser cutter, this is by no means intended to be limiting. Many of the features described below can be implemented with other types of computer numerically controlled machines.

As a laser cutter/engraver, the computer numerically controlled machine 100 may be subject to particularly challenging design constraints. For example, a laser cutter/engraver is subject to regulatory guidelines that restrict the egress of electromagnetic energy from the unit when operating, making it challenging for light to enter or escape the unit safely, for example to view or record an image of the contents. The beam of a laser cutter/engraver must be routed from the emitter to the area to be machined, potentially requiring a series of optical elements such as lenses and mirrors. The beam of a laser cutter/engraver is easily misdirected, with a small angular deflection of any component relating to the beam path potentially resulting in the beam escaping the intended path, potentially with undesirable consequences. A laser beam may be capable of causing material destruction if uncontrolled. A laser cutter/engraver may require high voltage and/or radio frequency power supplies to drive the laser itself.

Liquid cooling is common in laser cutter/engravers to cool the laser, requiring fluid flow considerations. Airflow is important in laser cutter/engraver designs, as air may become contaminated with byproducts of the laser's interaction with the material, such as smoke, which may in turn damage portions of the machine for example fouling optical systems. The air exhausted from the machine may contain undesirable byproducts such as, for example, smoke that must be routed or filtered, and the machine may need to be designed to prevent such byproducts from escaping through an unintended opening, for example by sealing components that may be opened. Unlike most machining tools, the kerf—the amount of material removed during the operation—is both small and variable depending on the material being processed, the power of the laser, the speed of the laser, airflow near the processing area, and other factors, making it difficult to predict the final size of the object.

Also unlike some machining tools, the output of the laser cutter/engraver is very highly dependent on the speed of operation; a momentary slowing can create a thermal event, causing damage to the material by depositing too much laser energy in the location where the slowing occurs. In many machining tools, operating parameters such as tool rotational speed and volume of material removed are easy to continuously predict, measure, and calculate, while laser cutter/engravers are more sensitive to material and other conditions. In many machining tools, fluids are used as coolant and lubricant; in laser cutter/engravers, the cutting mechanism does not require physical contact with the material being affected, and air or other gasses may be used to aid the cutting process in a different manner, by facilitating combustion or clearing debris, for example.

Referring again to FIG. 1, the computer numerically controlled machine 100 can have a housing surrounding an enclosure or interior area defined by the housing. The housing can include walls, a bottom, and one or more openings to allow access to the computer numerically controlled machine 100. In addition, the material bed 150 may be disposed at least partially within the housing of the computer numerically controlled machine 100 and may include a top surface on which the material 140 generally rests.

In the example of the computer numerically controlled machine 100 shown in FIG. 1, the computer numerically controlled machine 100 can also include an openable barrier as part of the housing to allow access between an exterior of the computer numerically controlled machine and an interior space of the computer numerically controlled machine. The openable barrier can include, for example, one or more doors, hatches, flaps, lids, and the like that can actuate between an open position and a closed position. The openable barrier can attenuate the transmission of light between the interior space and the exterior when in a closed position. Optionally, the openable barrier can be transparent to one or more wavelengths of light or be comprised of portions of varying light attenuation ability. One type of openable barrier can be a lid 130 that can be opened or closed to put material 140 on the material bed 150 on the bottom of the enclosure.

Various example implementations discussed herein include reference to a lid. It will be understood that absent explicit disclaimers of other possible configurations of the operable barrier or some other reason why a lid cannot be interpreted generically to mean any kind of openable barrier, the use of the term lid is not intended to be limiting. One example of an openable barrier can be a front door that is normally vertical when in the closed position and can open horizontally or vertically to allow additional access. There can also be vents, ducts, or other access points to the interior space or to components of the computer numerically controlled machine 100. These access points can be for access to power, air, water, data, etc. Any of these access points can be monitored by cameras, position sensors, switches, etc. If they are accessed unexpectedly, the computer numerically controlled machine 100 can execute actions to maintain the safety of the user and the system, for example, a controlled shutdown. In other implementations, the computer numerically controlled machine 100 can be completely open (i.e. not having a lid 130, or walls). Any of the features described herein can also be present in an open configuration, where applicable.

The computer numerically controlled machine 100 can have one or more heads including, for example, the head 160, which can be operated to alter the material 140. The head 160 may be configured to steer a beam of electromagnetic energy to a desired location on the material 140 positioned in the working area of the computer numerically controlled machine 100. For instance, the head 160 may be mobile including by translating and/or rotating to locate a beam of electromagnetic energy from a source configured to generate and/or emit the electromagnetic energy. Alternatively, the head 160 may be stationary and the beam of electromagnetic energy may be located by translating and/or rotating one or more optical components configured to route the electromagnetic energy from the head 160. It should be appreciated that the computer numerically controlled machine 100 may include multiple heads that operate independently or in unison to locate the beam of electromagnetic energy.

In some implementations of the current subject matter, the head 160 can be configured to include a combination of optical, electronic, and/or mechanical components that can, in response to commands, cause a laser beam or electromagnetic energy to be delivered to cut or engrave the material 140. The source (e.g., an emitter and/or the like) generating the electromagnetic energy may be part of the head 160 or separate from the head 160. The computer numerically controlled machine 100 can also execute operation of a motion plan for causing movement of the head 160 in implementations where the head 160 is configured to be mobile.

In some implementations of the current subject matter, the computer numerically controlled machine 100 may accept a user drawing, acting as a source file that describes the designs the user wants to create or the cuts that a user wishes to make. Examples of source files include .STL files that define a three-dimensional object that can be fabricated with a 3D printer or carved with a milling machine, .SVG files that define a set of vector shapes that can be used to cut or draw on material, JPG files that define a bitmap that can be engraved on a surface, and CAD files or other drawing files that can be interpreted to describe the object or operations. Other examples of source files include PDF files, DXF files, and/or the like.

A source file may be converted into a machine file (e.g., by a computer program and/or the like) that can be interpreted by the computer numerically machine 100 to take certain actions. The machine file may describe the idealized motion of the computer numerically controlled machine 100 to achieve a desired outcome. As one example, if the source file specifies a rectangle, then the machine file can instruct the computer numerically controlled machine 100 to translate the head 160 (and/or one or more optical elements) to deliver the electromagnetic energy to effect the rectangle in the material 140. The machine file can omit some information (e.g., the dimensions of the rectangle and/or the like) and/or add information (e.g., an instruction to move the head 160 from its home position to a corner of the rectangle to begin fabrication). The instructions can even depart from the directly expressed intent of the user.

Once the machine file has been created, a motion plan for the computer numerically controlled machine 100 can be generated. As used herein, a "motion plan" may contain the data that determines the actions of components of the computer numerically controlled machine 100 at different points in time. The motion plan may be generated on the computer numerically controlled machine 100 itself or at least partially on another computing system. The motion plan may include a stream of data that describes, for example, electrical pulses that indicate exactly how motors should turn, a voltage that indicates the desired output power of a laser, a pulse train that specifies the rotational speed of a mill bit, etc. Unlike the source files and the machine files such as G-code, the motion plan may be defined by the presence of a temporal element, either explicit or inferred, indicating the time or time offset at which each action should occur. This allows for one of the key functions of a motion plan, coordinated motion, wherein multiple actuators coordinate to have a single, pre-planned affect.

The motion plan renders the abstract, idealized machine file as a practical series of electrical and mechanical tasks. For example, a machine file might include the instruction to "move one inch to the right at a maximum speed of one inch per second, while maintaining a constant number of revolutions per second of a cutting tool." The motion plan may therefore take into consideration that the motors cannot accelerate instantly, and instead must "spin up" at the start of motion and "spin down" at the end of motion. The motion plan would then specify pulses (e.g. sent to stepper motors or other apparatus for moving the head or other parts of computer numerically controlled machine 100) occurring slowly at first, then faster, then more slowly again near the end of the motion.

The machine file is converted to the motion plan by the motion controller/planner. Physically, the motion controller can be a general or special purpose computing device, such as a high performance microcontroller or single board computer coupled to a Digital Signal Processor (DSP). The job of the motion controller is to take the vector machine code and convert it into electrical signals that will be used to drive the motors on the computer numerically controlled machine 100, taking into account the exact state of the computer numerically controlled machine 100 at that moment and physical limitations of the machine. The signals can be step and direction pulses fed to stepper motors or location signals fed to servomotors among other possibilities, which create the motion and actions of the computer numerically controlled machine 100, including the operation of elements like actuation of the head 160, moderation of heating and cooling, and other operations. In some implementations of the current subject matter, a compressed file of electrical signals can be decompressed and then directly output to the motors. These electrical signals can include binary instructions similar to 1's and 0's to indicate the electrical power that is applied to each input of each motor over time to effect the desired motion.

In some implementations of the current subject matter, the motion plan may take into account the detailed physics of the computer numerically controlled machine 100 itself, and translates the idealized machine file into implementable steps. For example, a particular computer numerically controlled machine 100 might have a heavier head, and require more gradual acceleration. This limitation is modeled in the motion planner and affects the motion plan. Different models of the computer numerically controlled machine 100 can require precise tuning of the motion plan based on its measured attributes (e.g. motor torque) and observed behavior (e.g. belt skips when accelerating too quickly). The computer numerically controlled machine 100 can also tune the motion plan on a per-machine basis to account for variations from machine to machine.

The motion plan can be generated and fed to the output devices in real-time, or nearly so. The motion plan can also be pre-computed and written to a file instead of streamed to the computer numerically controlled machine 100, and then read back from the file and transmitted to the computer numerically controlled machine 100 at a later time. Transmission of instructions to the computer numerically controlled machine 100, for example, portions of the machine file or motion plan, can be streamed as a whole or in batches from the computing system storing the motion plan. Batches can be stored and managed separately, allowing pre-computation or additional optimization to be performed on only part of the motion plan. In some implementations, a file of electrical signals, which may be compressed to preserve space and decompressed to facilitate use, can be directly output to the motors. The electrical signals can include binary instructions similar to 1's and 0's to indicate actuation of the motor.

The motion plan can be augmented, either by precomputing in advance or updating in real-time, with the aid of machine vision. Machine vision is a general term that describes the use of sensor data, and not only limited to optical data, in order to provide additional input to machine operation. Other forms of input can include, for example, audio data from an on-board sound sensor such as a microphone, or position/acceleration/vibration data from an on-board sensor such as a gyroscope or accelerometer. Machine vision can be implemented by using cameras to provide images of, for example, the computer numerically controlled machine 100, the material 140 being operated on by the computer numerically controlled machine 100, the environment of the computer numerically controlled machine 100 (if there is debris accumulating or smoke present), or any combination of these. These cameras can then route their output to a computer for processing. By viewing the computer numerically controlled machine 100 in operation and analyzing the image data it can, for example, be determined if the computer numerically controlled machine 100 is working correctly, if the computer numerically controlled machine 100 is performing optimally, the current status of the computer numerically controlled machine 100 or subcomponents of the computer numerically controlled machine 100, etc. Similarly, the material 140 can be imaged and, for example, the operation of the computer numerically controlled machine 100 can be adjusted according to instructions, users can be notified when the project is complete, or information about the material 140 can be determined from the image data. Error conditions can be identified, such as if a foreign body has been inadvertently left in the computer numerically controlled machine 100, the material has been inadequately secured, or the material is reacting in an unexpected way during machining.

Electromagnetic energy effecting one or more changes in the material 140 that is at least partially contained within the interior space of the computer numerically controlled machine 100 may be delivered by moving the head 160 and/or one or more optical components configured to route the electromagnetic energy from one location to another. In one implementation, the position and orientation of the optical elements inside the head 160 can be varied to adjust the position, angle, or focal point of a laser beam. For example, mirrors can be shifted or rotated, lenses translated, etc. The head 160 can be mounted on a translation rail 170 that is used to move the head 160 throughout the enclosure. In some implementations the motion of the head 160 can be linear, for example on an X axis, a Y axis, or a Z axis. In other implementations, the head 160 can combine motions along any combination of directions in a rectilinear, cylindrical, or spherical coordinate system.

A working area for the computer numerically controlled machine 100 can be defined by the limits within which the head 160, whether stationary or mobile, can cause delivery of a machining action, or delivery of a machining medium, for example electromagnetic energy. The working area can be inside the interior space defined by the housing. It should be understood that the working area can be a generally three-dimensional volume and not a fixed surface. For example, if the range of travel of a vertically oriented laser cutter is a 10"×10" square entirely over the material bed 150, and the laser from the laser beam comes out of the laser cutter at a height of 4" above the material bed of the computer numerically controlled machine, that 400 in$^2$ volume can be considered to be the working area.

The working area can be defined by the extents of positions in which material 140 can be worked by the computer numerically controlled machine 100. As such, the boundaries of the working area may not necessarily be defined or limited by the range of travel of any one component. For example, if the head 160 could turn at an angle, then the working area could extend in some direction beyond the travel of the head 160. By this definition, the working area can also include any surface, or portion thereof, of any material 140 placed in the computer numerically controlled machine 100 that is at least partially within the working area, if that surface can be worked by the computer numerically controlled machine 100. Similarly, for oversized material, which may extend even outside the computer numerically controlled machine 100, only part of the material 140 might be in the working area at any one time.

The translation rail 170 can be any sort of translating mechanism that enables movement of the head 160 in the X-Y direction, for example a single rail with a motor that slides the head 160 along the translation rail 170, a combination of two rails that move the head 160, a combination of circular plates and rails, a robotic arm with joints, etc.

Components of the computer numerically controlled machine 100 can be substantially enclosed in a case or other enclosure. The case can include, for example, windows, apertures, flanges, footings, vents, etc. The case can also contain, for example, a laser, the head 160, optical turning systems, cameras, the material bed 150, etc. To manufacture the case, or any of its constituent parts, an injection-molding process can be performed. The injection-molding process can be performed to create a rigid case in a number of designs. The injection molding process may utilize materials with useful properties, such as strengthening additives that enable the injection molded case to retain its shape when heated, or absorptive or reflective elements, coated on the surface or dispersed throughout the material for example, that dissipate or shield the case from laser energy. As an example, one design for the case can include a horizontal slot in the front of the case and a corresponding horizontal slot in the rear of the case. These slots can allow oversized material to be passed through the computer numerically controlled machine 100.

Optionally, there can be an interlock system that interfaces with, for example, the openable barrier, the lid 130, door, and the like. Such an interlock is required by many regulatory regimes under many circumstances. The interlock can then detect a state of opening of the openable barrier, for example, whether a lid 130 is open or closed. In some implementations, an interlock can prevent some or all functions of the computer numerically controlled machine 100 while an openable barrier, for example the lid 130, is in the open state (e.g. not in a closed state). The reverse can be true as well, meaning that some functions of the computer numerically controlled machine 100 can be prevented while in a closed state. There can also be interlocks in series where, for example, the computer numerically controlled machine 100 will not operate unless both the lid 130 and the front door are both closed. Furthermore, some components of the computer numerically controlled machine 100 can be tied to states of other components of the computer numerically controlled machine, such as not allowing the lid 130 to open while the laser is on, a movable component moving, a motor running, sensors detecting a certain gas, etc. In some implementations, the interlock can prevent emission of electromagnetic energy from the head 160 when detecting that the lid 130 is not in the closed position.

Figure 3:
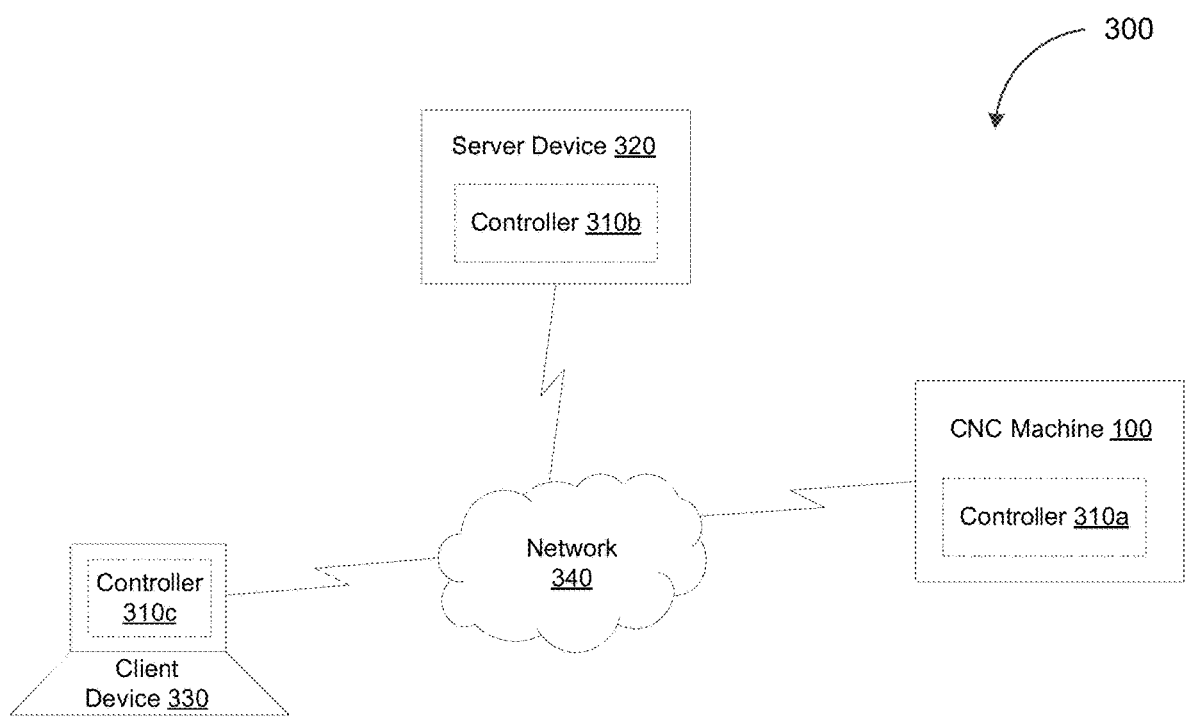
FIG. 3 depicts a system diagram illustrating an example of a computer numerically controlled processing system consistent with implementations of the current subject matter.

FIG. 3 depicts a block diagram illustrating an example of a computer numerically controlled processing system 300 consistent with implementations of the current subject matter. Referring to FIGS. 1-2, and 3, the computer numerically controlled processing system 300 may include the computer numerically controlled (CNC) machine 100 and a controller 310 configured to control the operations of the computer numerically controlled machine 100. As shown in FIG. 3, the controller 310 may be deployed at one or more locations. For example, as shown in FIG. 3, a first controller 310a may be deployed at the computer numerically controlled machine 100. Alternatively and/or additionally, a second controller 310b may be deployed at a server device 320 and/or a third controller 310c may be deployed at the client device 330. The server device 320 and the client device 330 may be communicatively coupled with the computer numerically controlled machine 100.

Accordingly, one or more functionalities of the controller 310, including those associated with the analysis and thermal verification, may be performed at the computer numerically controlled machine 100, the server device 320, and/or the client device 330. Moreover, in some instances, at least a portion of the analysis and thermal verification may be performed in a web browser, for example, at the client device 300. Whether performed at the computer numerically controlled machine 100, the server device 320, and/or the client device 330, it should be appreciated that the analysis and thermal verification may be performed as part of a fabrication or fabrication process in which the computer numerically controlled machine 100 processes, for example, the material 140 to achieve one or more designs.

As shown in FIG. 3, the computer numerically controlled machine 100 may be communicatively coupled with the server device 320 and/or the client device 330 via a network 340. Moreover, the client device 330 and the server device 320 may also be communicatively coupled via the network 340. The network 340 may be a wired network and/or a wireless network including, for example, a local area network (LAN), a virtual local area network (VLAN), a wide area network (WAN), a public land mobile network (PLMN), the Internet, and/or the like. The client device 330 and the server device 320 may be one or more processor-based computing devices such as, for example, a smartphone, a tablet computer, a laptop computer, a desktop computer, a workstation, a wearable apparatus, an Internet-of-Things (IoT) appliance, and/or the like. The client device 330 and the server device 320 may include computer software and hardware configured to provide one or more functionalities of the controller 310 such that the functionalities of the controller 310 are accessible, via the network 340, to the computer numerically controlled machine 100 and/or the client device 330.

In some implementations of the current subject matter, the controller 310 may be configured to identify, before the computer numerically controlled machine 100 processes the material 140, thermal events that may occur during a fabrication or fabrication process. As used herein, a "thermal event" may refer to a condition in which one or more regions of the material 140 exhibiting an undesirable response, for example, as a result of being exposed to an unsuitable or undesirable quantity of electromagnetic energy (e.g., a quantity of electromagnetic energy that fails to satisfy one or more thresholds such as more than a maximum quantity of energy exposure, less than a minimum quantity of energy exposure, and/or the like). Moreover, a thermal event may be predicted if the controller 310 determines that the likelihood of the thermal event occurring exceeds a threshold value (e.g., more than an 80% probability and/or the like). For example, the controller 310 may determine that one or more regions of the material 140 are likely to overheat (or under heat) as a result of the electromagnetic energy delivered to the material 140 during the processing of the material 140 to achieve one or more designs. As used herein, the terms "fabrication" and "fabrication process" may be used interchangeably to refer to the processing of a material, such as the material 140, to achieve one or more designs.

In some implementations of the current subject matter, the controller 310 may analyze one or more designs to determine the likelihood of a thermal event occurring if the material 140 is processed to achieve the one or more designs. As noted earlier, a source file describing an intended design may be converted to a machine file before being translated into a motion plan. It should be appreciated that the analysis and thermal verification may be performed at any point during this conversion process, for example, on any one of the source file, the machine file, and/or the motion plan.

A source file (e.g., a SVG file, a PDF file, and/or the like) may be analyzed by rendering an image of the designs described in the source file. The designs described in the source file may be rendered in a single color (e.g., black) with an opacity level that corresponds to the power that is deposited to achieve the design. For example, full laser power may be represented as 50% opacity (or a different opacity level). Moreover, gradients may be used to represent the way energy impacts the material 140 outside of the cut line. For instance, a 0.006" wide laser spot may impact material 0.06" away to a lesser extent. As such, the gradient line may in fact be much wider than the actual cut line, with greater opacity towards the center of the gradient line (e.g., to represent greater energy exposure near the cut line) and more transparency towards the edges of the gradient line (e.g., to represent less energy exposure farther away from the cut line).

Figure 11A:
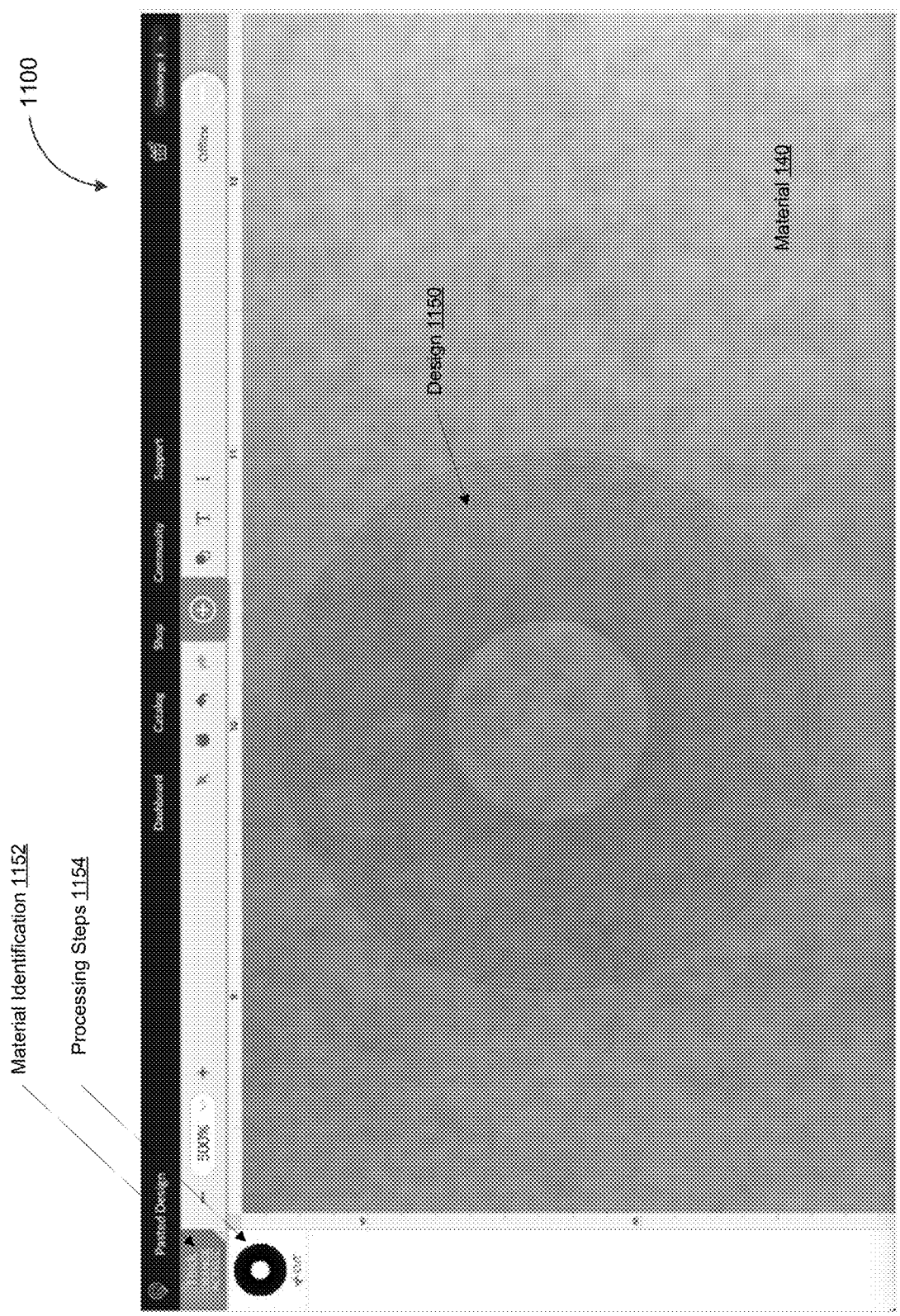
FIG. 11A depicts a user interface displaying an example of a design used for thermal calibration consistent with implementations of the current subject matter.
Figure 11B:
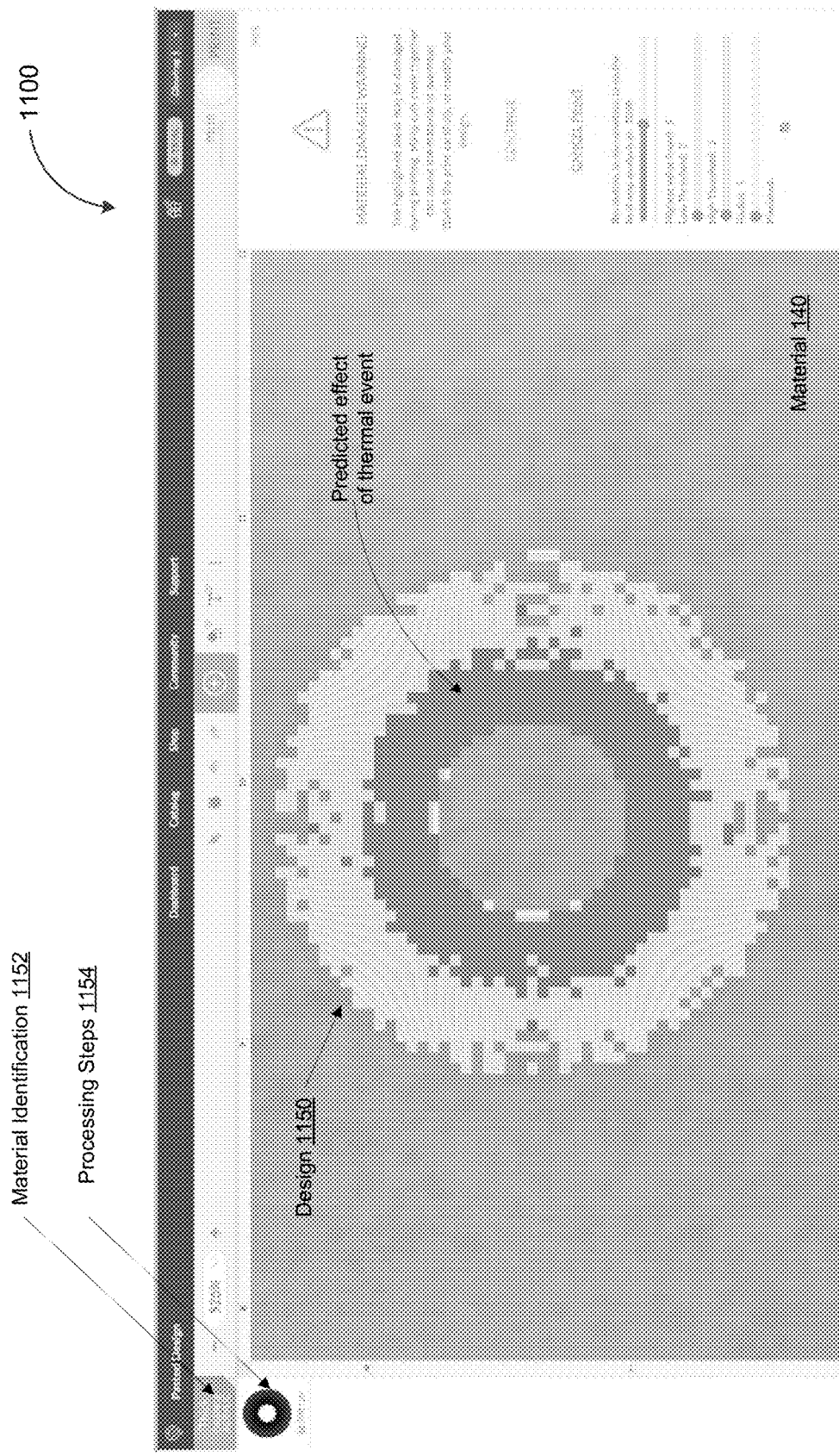
FIG. 11B depicts a user interface displaying an example of a predicted result of thermal calibration consistent with implementations of the current subject matter.
Figure 11C:
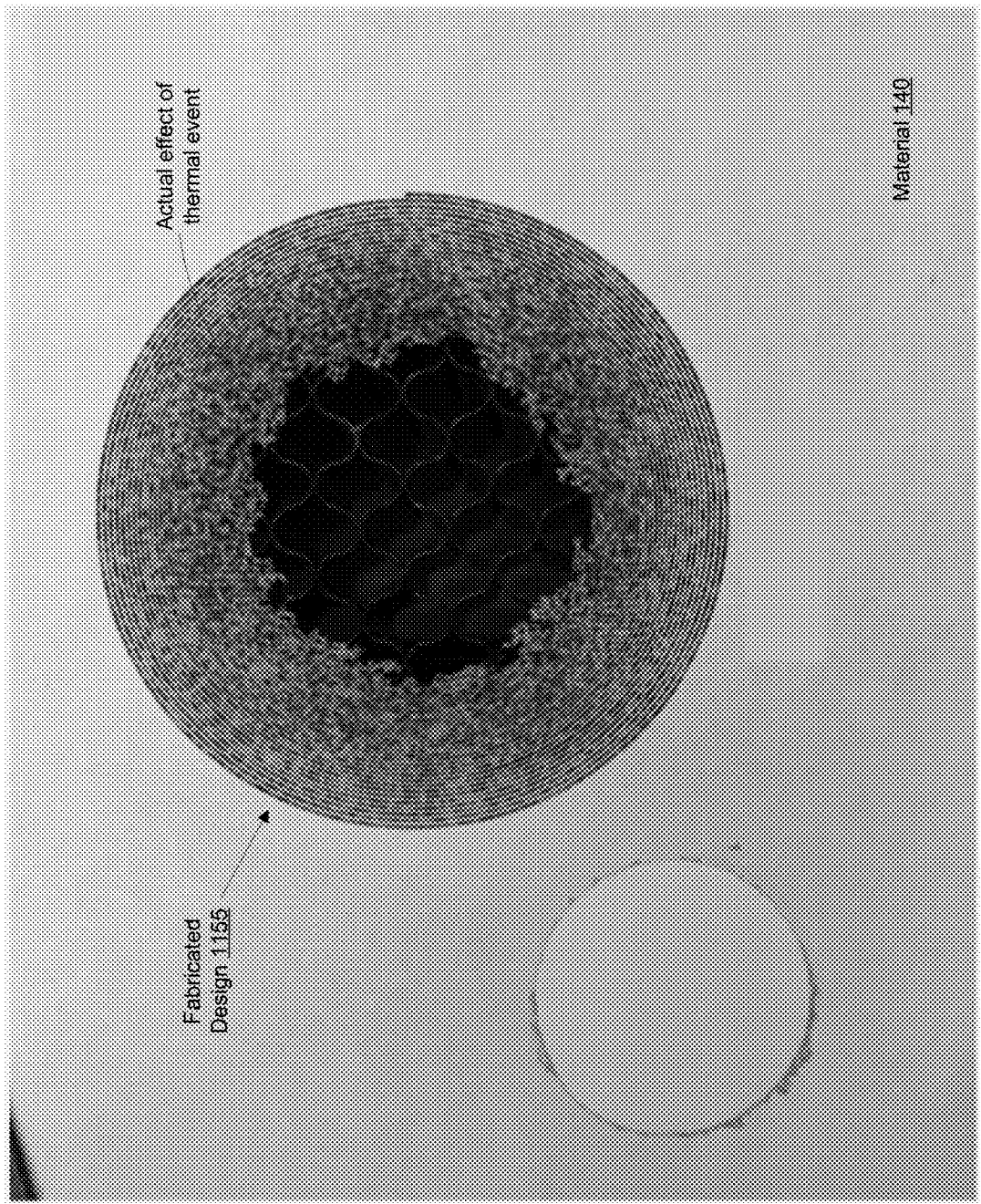
FIG. 11C depicts a material subject to an example of thermal calibration consistent with implementations of the current subject matter.
Figure 11D:
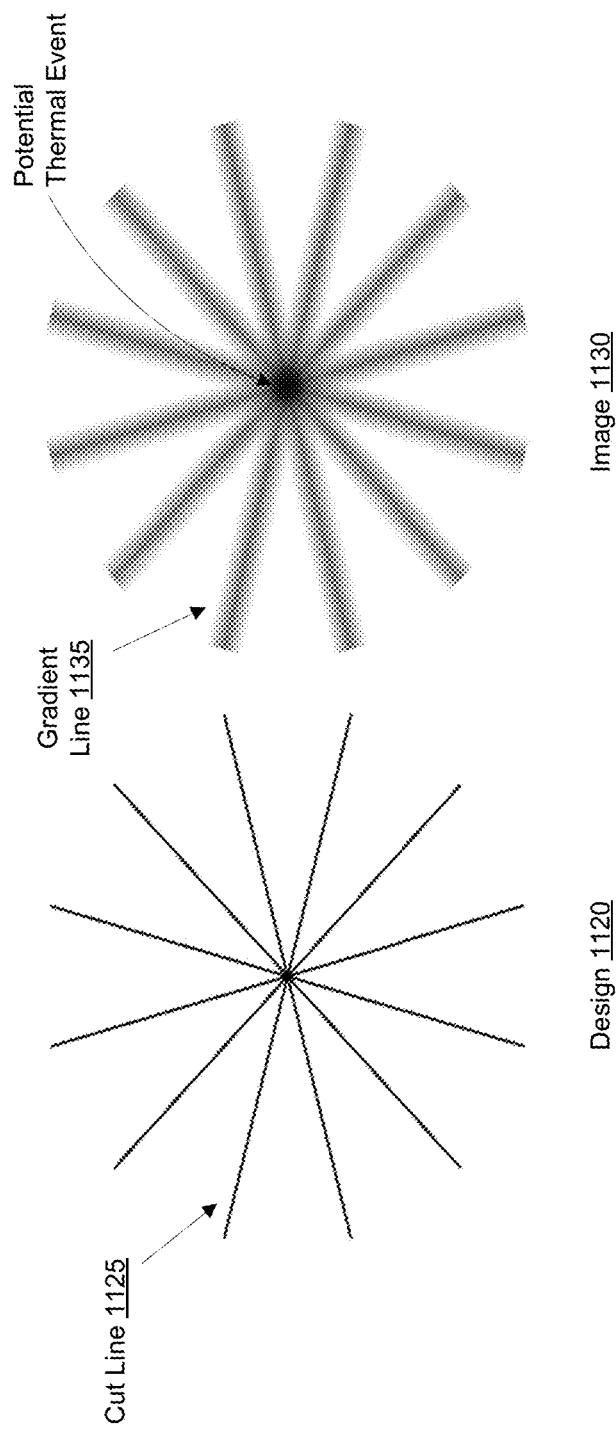
FIG. 11D depicts an example of an image rendered for analyzing a source file consistent with implementations of the current subject matter.

To further illustrate, FIG. 11D depicts an example of a design 1120 described by a source file and a corresponding image 1130 of the design 1120 that is rendered to analyze the source file for potential thermal events. As shown in FIG. 11D, the image 1130 may include gradient lines (e.g., gradient line 1135 and/or the like) that are wider than the corresponding cut lines (e.g., cut line 1125) present in the design 1120. The gradient lines represent how energy may impact the material 140 outside the cut line. For example, as shown in FIG. 11D, the gradient line 1135 may be more opaque towards its center to represent greater energy exposure near the cut line 1125 and more transparent towards its edges to represent less energy exposure away from the cut line.

In some implementations of the current subject matter, the image 1130 may be rendered and analyzed to determine a likelihood of one or more thermal events occurring if the material 140 is processed to achieve the design 1120. For example, one or more regions of the image 1130 that are darker (e.g., more opaque) than a certain threshold may be identified as being at risk for a thermal event. Referring to the example shown in FIG. 11D, the center region of the design 1120 where multiple cut lines intersect may be rendered as having an above threshold opacity (e.g., pure black) in the image 1130. As such, the controller 310 may determine, based at least on the image 1130, that a thermal event is likely to occur at the center region of the design 1120 if the material 140 is processed to achieve the design 1120.

To determine whether a thermal event may occur during a fabrication or a fabrication process, the controller 310 may perform one or more simulations to determine energy exposure across the material 140 when the computer numerically controlled machine 100 processes the material 140 to achieve one or more designs. For instance, the one or more simulations may model, for the type of the material 140, various conditions at the computer numerically controlled machine 100 including, for example, energy exposure, energy transfer (e.g., through cooling, heating, conduction, radiation), airflow, existing edges on the material 140, new edges on the material 140 created as a result of the processing, and/or the like. Moreover, the controller 310 may be configured to provide a visualization of the quantity of energy exposure across the material 140. For example, the controller 310 may generate one or more heat maps indicating the quantity of energy exposure across the material 140. Alternatively and/or additionally, the controller 310 may generate a preview of an outcome of the processing of the material 140 that depicts the effects of any thermal events that may occur during the processing of the material 140. The controller 310 may generate a variety of outputs based on the analysis and thermal verification to predict whether one or more thermal events are likely to occur during the processing of the material 140. Notably, different types of thermal events may be detected and acted upon differently (e.g., a thermal event of material discoloration may result in a different notification to the user than a thermal event that results in material catching on fire).

The controller 310 may detect, based at least on the one or more simulations, thermal events that may occur during the processing of the material 140 including, for example, one or more regions of the material 140 that may overheat and/or under heat during the processing of the material 140. The controller 310 may generate an alert if the controller 310 determines that one or more thermal events may occur during the processing of the material 140. Alternatively and/or additionally, in response to detecting one or more potential thermal events, the controller 310 may determine one or more corrective actions for resolving the thermal events. The alert and/or the corrective actions may be presented at a user interface (e.g., a graphic user interface (GUI)) at the computer numerically controlled machine 100 and/or the client device 330.

In some cases, the result of the analysis and thermal verification may indicate that a thermal event is unlikely to occur during the processing of the material given the current designs, characteristics of the material 140, and/or operating parameters of the computer numerically controlled machine 100. However, the controller 310 may detect a subsequent change in the designs, characteristics of the material 140, and/or operating parameters of the computer numerically controlled machine 100, in which case the one or more corrective actions may include an alert and/or a recommendation to restore the previous designs, characteristics of the material 140, and/or settings of the computer numerically controlled machine 100. For example, the result of the analysis and thermal verification may indicate that a thermal event is unlikely to occur given the presence of airflow at the computer numerically controlled machine 100 (e.g., "air assist" feature is enabled). If the controller 310 subsequently detects an absence of airflow (e.g., disabling of the "air assist" feature), the controller 310 may generate an alert for a potential thermal event and/or a recommendation to restore airflow at the computer numerically controlled machine 100. A number of factors may determine whether one or more regions of the material 140 may overheat and/or under heat during the processing of the material 140 including, for example, the one or more designs being effected in the material 140, one or more characteristics of the material 140, operating parameters of the computer numerically controlled machine 100, conditions imposed by the ambient environment, and/or the like. Accordingly, in some implementations of the current subject matter, the one or more simulations may be configured to account for a variety of factors including, for example, the power of the electromagnetic energy delivered (e.g., full power, a fraction of full power, the intended power in watts, the measured power output using a power sensor, or the like), ambient temperature (e.g., to model convective heat loss from air circulation), convection coefficient of the material and ambient air (e.g., a unit of heat flux measured in $$\frac{\text{Power}}{(\text{Area} \times \text{Temperature})}),$$

thickness of the material (e.g., to model simulation cell boundary area), density, molar mass, and specific heat of the material (e.g., to create an energy relationship with respect to temperature), enthalpy and temperature of phase change (e.g., to model the nonlinearity in specific heat), spot distribution sigma of the electromagnetic energy (e.g., to model the intensity of the electromagnetic energy on individual cells using a probability distribution such as Gaussian distribution), and/or the like.

Additional factors may include airflow at the computer numerically controlled machine 100 (e.g., fan on, fan functioning efficiently, pass through slot open or closed, "air assist" feature enabled, etc.), previous processing of the material 140 (e.g., cutting near an edge, deposition of soot or other debris that may affect combustion characteristics, etc.), and/or the like. The presence of airflow directed at the cut zone (e.g., a feature sometimes called "air assist") may significantly change the likelihood of thermal events as well as add oxygen to assist in the processing of the material 140. Analysis and thermal verification may therefore be required to account for the presence (or absence) of airflow including, for example, whether an "air assist" feature is enabled or disabled at the computer numerically controlled machine. For example, if the "air assist" feature is disabled by the user (or by preprogrammed settings for the material 140) to prevent a scattering of the material 140, which is common when processing paper, analysis and thermal verification may be required to account for an change in the likelihood of thermal events due to the absence of airflow.

Another factor that may affect the likelihood of a thermal event occurring during the processing of the material 140 may be surface area, which may change throughout the fabrication process. For example, a smaller fragment of the material 140 may be more prone to ignition than a larger fragment of the material 140 because the smaller fragment of the material 140 may heat up more quickly and has a higher surface area (e.g., with more sides exposed to oxygen). As such, earlier processing operations that increase the surface area of the material 140 (e.g., cutting small squares into the material 140 and/or the like) may increase the risk of thermal events for subsequent processing operations in the same regions of the material 140. That is, if a first line is cut in through a solid portion of the material 140 but one or more subsequent lines are cut across the first line, depositing energy in an area of the material with a higher surface area due to the presence of the first line is more likely to cause a thermal event.

Accordingly, analysis and thermal verification, including simulations, may be configured to take into account the pattern and/or sequence of energy deposition of the beam. Moreover, the beam of electromagnetic energy delivered by the head 160 may cause different responses at the material 140. That is, the beam of electromagnetic energy may cause the material 140 to heat, burn, and/or vaporize depending on the characteristics of the material 140 as well as the energy density of the beam. For example, a tightly focused beam delivered to paper may cause the paper to vaporize quickly whereas defocusing the beam slightly may cause the paper to ignite instead. The analysis and thermal verification may therefore further take into account the focus of the beam of electromagnetic energy (e.g., the spot size of the electromagnetic energy when ideally focused and whether the beam is focused or defocused deliberately by a user and/or the like) as well as other beam characteristics such as the size of the spot formed by the beam incident on the material 140.

In some implementations of the current subject matter, the controller 310 may be configured to perform a time-variant simulation of a fabrication in which the material 140 is processed to achieve one or more designs. The time-variant simulation may model one or more factors (e.g., cooling, conduction, radiation, and/or the like) that cause temperature to change (e.g., increase and decrease) over time. For example, the time-variant simulation may be performed to determine the quantity of energy exposure across the material 140 at various points in time over the course of the fabrication. To provide a visualization of the time-variant simulation, the controller 310 may generate, for example, a first heat map providing a visual indication of a first quantity of energy exposure at a first time during the fabrication and a second heat map providing a visual indication of a second quantity of energy exposure at a second time during the fabrication. Moreover, a sequence of heat maps depicting the quantities of energy exposure at successive points in time may be presented, for example, as an animation, to provide a visualization of the quantity of energy exposure across the material 140 over the course of the fabrication. Alternatively and/or additionally, the controller 310 may generate one or more heat maps depicting a cumulative quantity of energy exposure across the material 140 over the course of processing the material 140.

Instead of and/or in addition to time-variant simulations, the controller 310 may also be configured to perform a time-invariant simulation of the fabrication in which the material 140 is processed to achieve one or more designs. The time-invariant simulation may be less complex than a time-variant simulation and require less computational resources and/or time than a time-variant simulation. Accordingly, the controller 310 may perform a time-invariant simulation in situations where the performance of a time-variant simulation is inefficient or impracticable. For example, the time-invariant simulation may be performed to determine a cumulative quantity of energy exposure across the material 140 over the course of processing the material 140. Moreover, to provide a visualization of the time-invariant simulation, the controller 310 may generate one or more heat maps depicting the cumulative quantity of energy exposure across the material 140. To determine the cumulative quantity of energy exposure across material 140, it should be appreciated that the time-invariant simulation may be configured to account for one or more time-varying parameters including, for example, dwell time, idle time, and/or the like.

For one or more parameters of the time-invariant simulation of the fabrication, the controller 310 may use values that have been determined in advance based on one or more time-variant simulations performed for a same or similar material as the material 140. The values of the parameters used for the time-invariant simulation may vary based on the type of the material 140. For instance, the controller 310 may apply a first set of predetermined parameter values for ⅛ inch maple hardwood and a second set of predetermined parameter values for ⅛ inch maple plywood. The first set of parameter values for ⅛ inch maple hardwood may be determined based on one or more time-variant simulations (and/or testing verification) that have been performed on ⅛ inch maple hardwood (and/or a similar material) while the second set of parameter values for ⅛ inch maple plywood may be determined based on one or more time-variant simulations (and/or testing verification) that have been performed on ⅛ inch maple plywood (and/or a similar material). Moreover, parameter values for different materials, such as the first set of values for ⅛ inch maple hardwood and the second set of values for ⅛ inch maple plywood, may be stored remotely at the server device 320. Alternatively and/or additionally, one or more sets of parameter values may be cached locally, for example, at the computer numerically controlled machine 100 and/or the client device 330.

Examples of the parameters whose values may be determined in advance may include maximum aggregation radius, thermal event thresholds, spot distribution sigma of the electromagnetic energy, simulation cell dimension, quantum of energy exposure, and nominal power of electromagnetic energy. Table 1 below provides a further description of these parameters. However, it should be appreciated that the controller 310 may also use predetermined values for parameters not shown in Table 1 when performing the time-invariant simulation. Moreover, the time-variant simulation may provide a reference or default value for one or more parameters of the corresponding time-invariant simulation as the predetermined values of at least some parameters of the time-invariant simulation may be subject to subsequent adjustments based on user inputs.

TABLE 1

| Parameter | Description |
| --- | --- |
| Maximum Aggregation Radius | Defines a range of values used when rendering one or more heat maps and thus sets the resolution of the heat map. For example, the heat map may be rendered to display the highest quantity of energy exposure encountered during the corresponding simulation within each circle having the set radius. |
| Thermal Event Thresholds | Defines mapping between the quantity of energy exposure and the corresponding heat map visual representation (e.g., color, intensity, and/or the like). Also defines the quantity of energy exposure that constitutes a thermal event (e.g., overheating, under heating, and/or the like) triggering an alert and/or corrective actions. |
| Spot Sigma of Electromagnetic Energy | Defines a standard deviation of energy exposure for the simulation. For example, the standard deviation may be modeled as a two-dimensional normal collimated column of electromagnetic energy, a three-dimensional hourglass shaped projection through a focal point, and/or the like. |
| Simulation Cell Dimension | Defines the spatial resolution of the simulation (e.g., the distance between adjacent measurements of energy exposure). |
| Quantum of Energy Exposure | To simplify analysis, energy values may be rounded to the nearest possible value. The smallest value that can be represented in this case is defined as the quantum of energy exposure. This may be expressed such as "the quantum of energy exposure in this simulation is one joule per square millimeter". |
| Nominal Power of Electromagnetic Energy | Defines energy output at full power. |

The values of the parameters used for a time-variant simulation or a time-invariant simulation may be uniform across the material 140 as well as over the entire course of the processing of the material 140. However, in some implementations of the current subject matter, the controller 310 may apply local adjustments to the values of at least some of the parameters used for the time-variant simulation or the time-invariant simulation in order to compensate for variations in one or more characteristics of the material 140 (e.g., density, thickness, warpage, material composition, and/or the like) and the power of the electromagnetic energy delivered to the material 140. For example, the material 140 may exhibit variations in density and thermal conductivity, in which case local variations in the values of at least some of the parameters may be necessary in order to avoid delivering excess power to some regions of the material 140. Alternatively and/or additionally, the height of the material 140 may be measured at multiple locations across the material 140 in order to account for warpage and/or variations in the thickness of the material 140. Various techniques may be used to determine the height of the material 140 including, for example, using data from one or more sensors (e.g., cameras, position sensors, and/or the like) at the computer numerically controlled machine 100.

In some implementations of the current subject matter, the time-variant simulation and/or the time-invariant simulation may be a two-dimensional simulation that models heat deposition and movement across the surface of the material 140. Alternatively and/or additionally, the time-variant simulation and/or the time-invariant simulation may be a three-dimensional simulation that further takes into account heat deposition and movement through the thickness of the material 140. For example, a three-dimensional simulation may account for variations in the thickness across the material 140, which may in turn vary the likelihood of thermal events as thicker regions of the material 140 may be less prone to combustion. A three-dimensional simulation may also account for variations in the composition of the material 140, which may in turn vary the likelihood of thermal events.

The time-variant simulation and/or the time-invariant simulation may also take into account any regions of the material 140 that are subject to consecutive processing operations. For example, one or more regions of the material 140 may be subject to a first processing operation (e.g., engraving) that reduces its thickness before the material 140 is subject to a second processing operation (e.g., cutting). The regions of the material 140 that are rendered thinner by the first processing operation may be more prone to thermal events than regions of the material 140 not subject to the first processing operation and are therefore thicker. As such, the time-variant simulation and/or the time-invariant simulation may be configured to account for variations in the thickness of the material 140 including those caused by any preprocessing and/or during the fabrication of the material 140. The thickness of the material 140 may be determined by measurements performed by one or more sensors at the computer numerically controlled machine, provided by one or more user inputs, known in advance (e.g., standard thickness), determined by calculating the quantity of the material 140 removed by processing, and/or the like.

As noted, how the material 140 responds to the processing of the material 140 may depend on one or more characteristics of the material 140 including, for example, type of material 140, thickness of the material 140, density of the material 140, the composition of the material 140, and/or the like. For example, a thicker and/or denser material may require more energy to achieve certain designs than a thinner and/or less dense material. Accordingly, simulating the processing of the material 140 may require identifying one or more characteristics of the material 140 including, for example, the type of the material 140, the thickness of the material 140, the density of the material 140, the composition of the material 140, and/or the like.

In some implementations of the current subject matter, in order to perform a time-variant simulation and/or a time-invariant simulation of the material 140, the controller 310 may apply one or more techniques to identify one or more characteristics of the material 140. For example, the controller 310 may identify one or more characteristics of the material 140 based on one or more user inputs specifying, for example, the type of the material 140, the thickness of the material 140, the density of the material 140, and/or the like. Alternatively and/or additionally, the controller 310 may identify one or more characteristics of the material 140 based on an identifier on the material 140 (e.g., a Quick Response (QR) code, a stock keeping unit (SKU) code, a barcode, and/or the like). The identifier on the material 140 may be mapped to one or more characteristics of the material 140 and/or the values of the parameters used for simulating the processing of the material 140. For instance, one or more images of the identifier on the material 140 may be captured using one or more sensors (e.g., cameras and/or the like) such that one or more characteristics of the material 140 and/or the values of the parameters used for simulating the processing of the material 140 may be retrieved from a data store based at least on the images of the identifier on the material 140. Moreover, the identifier on the material 140 may be part of a library of identifiers of known materials. As described in further detail below, this library of identifiers may be expanded to include user defined identifiers for one or more additional materials including, for example, rare materials, custom materials, and other materials the controller 310 does not already recognize.

In some implementations of the current subject matter, the controller 310 may also identify one or more characteristics of the material 140 based on data from one or more sensors (e.g., cameras, position sensors, and/or the like) at the computer numerically controlled machine 100. For example, the type of the material 140 may be determined based on how the material 140 responds to an electromagnetic energy from a laser or a non-laser source at the computer numerically controlled machine 100. Accordingly, the computer numerically controlled machine 100 may be configured to deliver, to the material 140, an electromagnetic energy at a wavelength that is detectable by the one or more sensors (e.g., a camera and/or the like) but having insufficient power to alter a physical appearance of the material 140.

One or more characteristics of the material 140 may be determined based on measurements from the one or more sensors indicating how the material 140 responds to the electromagnetic energy including, for example, a reflection, a subsurface diffusion, a diffraction, and/or the like exhibited by the material 140. For example, the response of the material 140 may be compared to the profiles of various reference materials such that the material 140 may be identified as a reference material (e.g., ⅛ inch maple hardwood) exhibiting an above-threshold similarity in its measured response to electromagnetic energy. Alternatively and/or additionally, the material 140 may be identified based on one or more images of the material 140, which may be compared to images of various reference materials. It should be appreciated that a variety of techniques may be applied, for example, to the measurements and/or images associated with the material 140, in order to identify the material 140. Examples of such techniques include machine learning models such as neural networks and/or the like.

In some implementations of the current subject matter, the controller 310 may be configured to recognize additional material having user defined material identifiers. For example, the controller 310 may not recognize the material 140, which may occur when the material 140 does not include a known identifier (e.g., a Quick Response (QR) code, a stock keeping unit (SKU) code, a barcode, and/or the like). To enable subsequent identification of the material 140, the controller 310 may receive one or more user inputs identifying one or more characteristics of the material 140 (e.g., ⅛ inch thick ACME Brand plywood).

Alternatively and/or additionally, the controller 310 may perform a thermal calibration in which the computer numerically controlled machine 100 is directed to perform one or more calibration fabrications configured to test how the material 140 responds to different processing (e.g., designs having different distributions of cuts). Thermal calibration may be especially useful in instances where one or more characteristics of the material 140 or at least some conditions at the computer numerically controlled machine 100 are unknown. For instance, the one or more calibration fabrications may be performed at an area of the material 140 outside of the fabrication area of the one or more designs. Alternatively, the one or more calibration fabrications may be performed within the fabrication area of the one or more designs if the processing of the material 140 may subsequently eliminate the artifacts associated with the one or more calibration fabrications. In some instances, the one or more calibration fabrications may include at least a portion of the designs such that the one or more calibration fabrications form at least a portion of the intended final appearance of the material 140.

In some implementations of the current subject matter, the design that is affected as part of the calibration fabrication may be configured to facilitate an identification of the location at which a thermal event occurred. One example of such a calibration fabrication may be a design that deposits laser energy at varying distances such that a user or a sensor (e.g., a camera and/or the like) may identify, based on the spacing, the locations at which a thermal event occurred. For instance, the computer numerically controlled machine 100 may process the material 140 to engrave or cut a spiral (or another design) where each successive turn is slightly closer than the preceding turn. One or more thermal events may occur at an area of the material 140 where the spacing between successive turns of the spiral is sufficiently small. The one or more thermal events may be observed as scorching in the material 140. Accordingly, when the calibration fabrication is complete, a user and/or a sensor (e.g., a camera and/or the like) may identify the one or more thermal events based on the scorching that is present in the material 140 (and/or another undesirable response in the material 140). Moreover, the user and/or the sensor may determine the location of the one or more thermal event based on the turn in the spiral at which the scorching occurred. The identification of the one or more thermal events as well as its location on the material 140 in comparison with the spacing of the cuts known from the source design may be used to conclude the spacing which caused the thermal event. This information may be used to calibrate the material 140.

To further illustrate, FIG. 11A depicts an example of a user interface 1100 displaying an example of a design 1150 used for thermal calibration consistent with implementations of the current subject matter. The example of the design 1150 shown in FIG. 11A may be a spiral in which each successive turn is slightly closer than the preceding turn. The design 1150 may be affected in the material 140 (e.g., thick orange acrylic as indicated by a material identification 1152 included in the user interface 1100) in order to perform a thermal calibration to determine how the material 140 responds to different processing (e.g., designs having different distributions of cuts). Furthermore, as indicated by the processing steps 1154 included in the user interface 1100, the design 1150 may be affected in the material 140 by cutting the design 1150 into the material 140 although it should be appreciated that the thermal calibration may include other processing operations (e.g., engraving and/or the like) for affecting the design 1150 in the material 140.

FIG. 11B depicts another example of the user interface 1100 displaying an example of a predicted result of thermal calibration consistent with implementations of the current subject matter. As shown in FIG. 11B, the user interface 1100 may display the predicted effects of the thermal events that are likely to occur as a result of affecting the design 1150 on the material 140 (e.g., cutting the design 1150 in thick orange acrylic). That is, the example of the user interface 1100 shown in FIG. 11B displays how the material 140 (e.g., thick orange acrylic as indicated by the material identification 1152) responds to the design 1150 being cut into the material 140. The actual effects of the thermal events that occurred as a result of affecting the design 1150 are shown in FIG. 11C. The result of the thermal calibration may be used to analyze and/or perform thermal verification on the material 140 and/or another piece of material that is same or similar to the material 140 (e.g., a material that is same and/or similar to thick orange acrylic).

One or more sensors (e.g., cameras and/or the like) at the computer numerically controlled machine 100 may capture one or more images of the material 140 subsequent to the calibration fabrications. Thermal artifacts (e.g., char, discoloration, and/or the like) present in these images may be indicative of how the material 140 responded to different processing. As such, the controller 310 may analyze these images to determine, based at least on the thermal artifacts present in the material 140, the corresponding parameters for subsequent time-invariant simulations of materials that are determined to be the same as and/or similar to the material 140 (e.g., ⅛ inch thick ACME Brand plywood). The running of each test fabrication and the corresponding analysis may be performed iteratively such that the parameters of subsequent test fabrications may be adjusted to avoid the faults and/or improve the outcome of the earlier test fabrications. For example, the controller 310 may adjust one or more parameters of a subsequent test fabrication in response to a previous test fabrication failing (e.g., causing excessive heat at the computer numerically controlled machine 100) and/or yielding insufficient data (e.g., too few discernable thermal artifacts).

It should be appreciated that the aforementioned thermal calibration may also be performed such that one or more parameters of time-variant simulations and/or time-invariant simulations performed for the computer numerically controlled machine 100 may be adapted based on actual data generated at the computer numerically controlled machine 100. For example, thermal calibration may also be performed in response to the occurrence of a thermal event during the processing of the material 140 at the computer numerically controlled machine 100. In response to the occurrence of the thermal event during the processing of the material 140, the controller 310 may perform a thermal calibration including by directing one or more sensors (e.g., cameras and/or the like) at the computer numerically controlled machine 100 to capture one or more images of the material 140. The controller 310 may further analyze the images to determine, based at least on the thermal artifacts present in the material 140, the corresponding parameters for subsequent simulations performed for the computer numerically controlled machine 100. For instance, the image of at least a portion of the material 140 subsequent to the thermal event as well as the corresponding fabrication settings and material settings may be captured for further analysis.

Alternatively and/or additionally, the controller 310 may perform thermal calibration in order for a user to establish one or more custom thermal artifacts. For example, in order to be consistent with the intended final appearance of the material 140, the computer numerically controlled machine 100 may be required to achieve a char in one or more regions of the material 140. The user may therefore define one or more custom thermal artifacts such that the deliberate charring of the material 140 does not constitute a thermal event that triggers a warning and/or corrective actions. For instance, the controller 310 may respond to a user request to define a custom thermal artifact by analyzing one or more images depicting the char that is consistent with the intended final appearance of the material 140. The controller 310 may further determine, based at least on the analysis of the images, the corresponding parameters including, for example, a thermal event threshold and/or the like.

Input from the user may identify one or more visual characteristics of the material 140 subsequent to the processing. These visual characteristics may include desirable characteristics that are consistent with the intended final appearance of the material 140 as well as undesirable characteristics that are inconsistent with the intended final appearance of the material 140. This user feedback as well as the characteristics of the material 140 and/or the corresponding fabrication settings may be analyzed and stored for future use. In one example, the user may provide an identifier (e.g., slight edge char (⅛" maple hardwood)) that can be used to reference the combination of thermal effects, fabrication settings, material characteristics, and/or the like. In another example, the user may provide an indication that the appearance of the material 140 subsequent to the processing is inconsistent with the intended final appearance of the material 140 (e.g., undesirable char, undesirable cut-through, and/or the like). User feedback as well as one or more characteristics of the corresponding designs, material characteristics, and fabrication settings may be stored on an individual (e.g., user-specific and/or machine-specific basis) or may be analyzed for use by other users and/or computer numerically controlled machines.

Figure 4A:
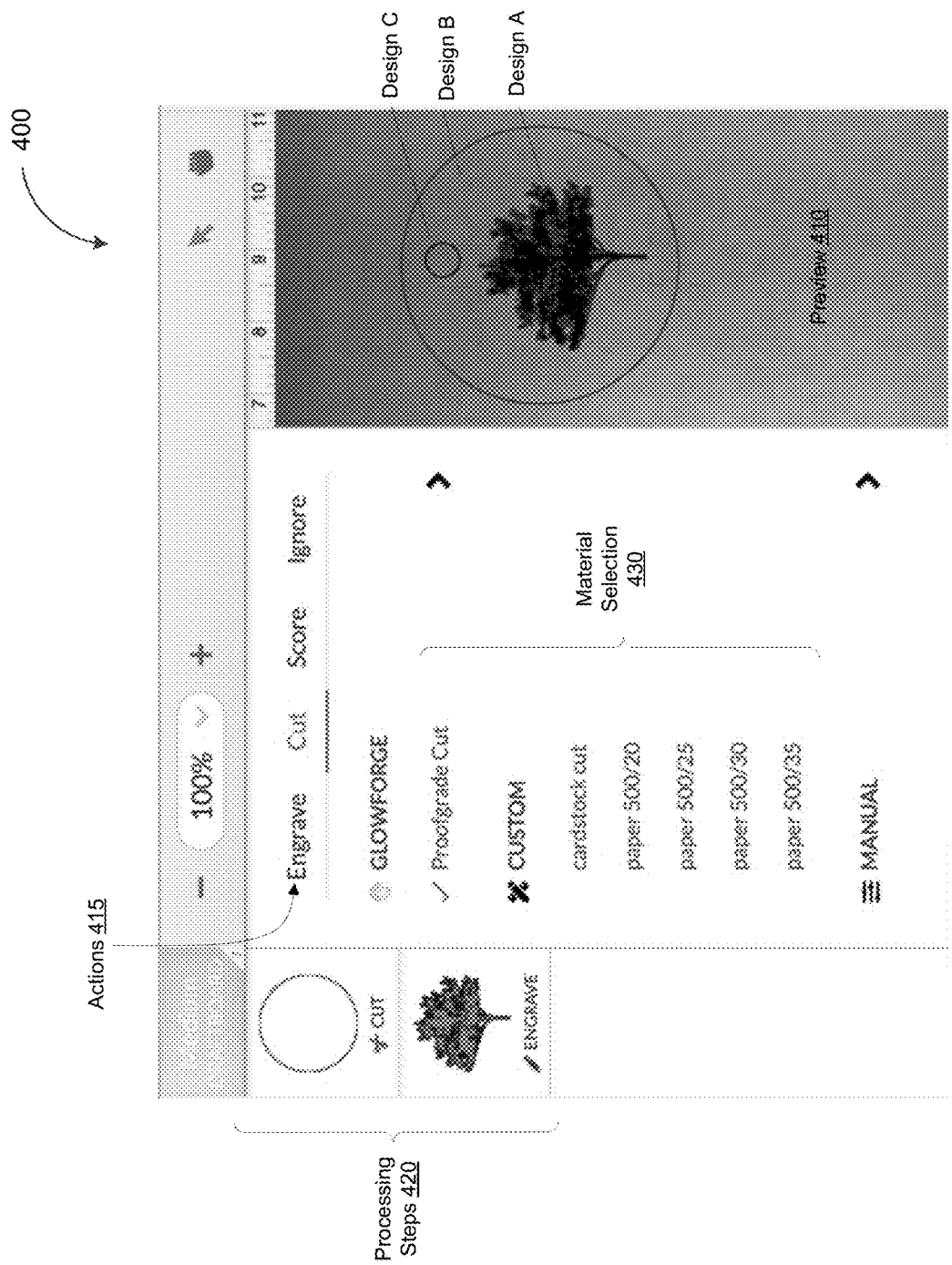
FIG. 4A depicts an example of a user interface for configuring a fabrication consistent with implementations of the current subject matter.

FIG. 4A depicts an example of a user interface 400 for configuring a fabrication consistent with implementations of the current subject matter. The user interface 400 may be a graphic user interface (GUI) presented at the computer numerically controlled machine 100, the server device 320, and/or the client device 330 to enable an interaction with the controller 310 to configure a fabrication. In some implementations of the current subject matter, configuring a fabrication may include specifying the placement of one or more designs on the material 140 such as, for example, Design A, Design B, and Design C. As shown in FIG. 4A, the user interface 400 may include a preview 410 of the material 140 upon which a user has placed Design A, Design B, and Design C. Moreover, configuring the fabrication may include specifying the type of processing (e.g., cut, engrave, and/or the like) associated with each design. For instance, in the example shown in FIG. 4A, the user interface 400 may include a selection of one or more actions 415. The fabrication may be configured by at least selecting, via the user interface 400, a first action to engrave Design A and a second action to cut each of Design B and Design C. The user interface 400 may further display, based at least on these selections, one or more processing steps 420 for processing the material 140. The processing steps 420 may indicate an order in which the different actions are to be performed. For example, the examples of the processing steps 420 shown in FIG. 4A includes cutting Design C (or Design B) before engraving Design A.

The configuring of the fabrication may also include identifying one or more characteristics of the material 140 (e.g., ⅛ inch thick medium density fiberboard). As noted, the characteristics of the material 140 may be determined based on an identifier on the material 140 (e.g., a Quick Response (QR) code, a stock keeping unit (SKU) code, barcode, and/or the like), one or more user inputs, data from one or more sensors at the computer numerically controlled machine 100, and/or the like. In the example of the user interface 400 shown in FIG. 4A, the user interface 400 may include a material selection 430. At least some of the characteristics of the material 140 may be determined based at least on a user input selecting, from the material selection 430, one or more materials. If the material 140 is identified automatically (e.g., by an identifier present on the material 140, measurements from sensors at the computer numerically controlled machine 100, and/or the like), the material selection 430 may include a default selection corresponding to a result of the automatic identification.

Figure 4B:
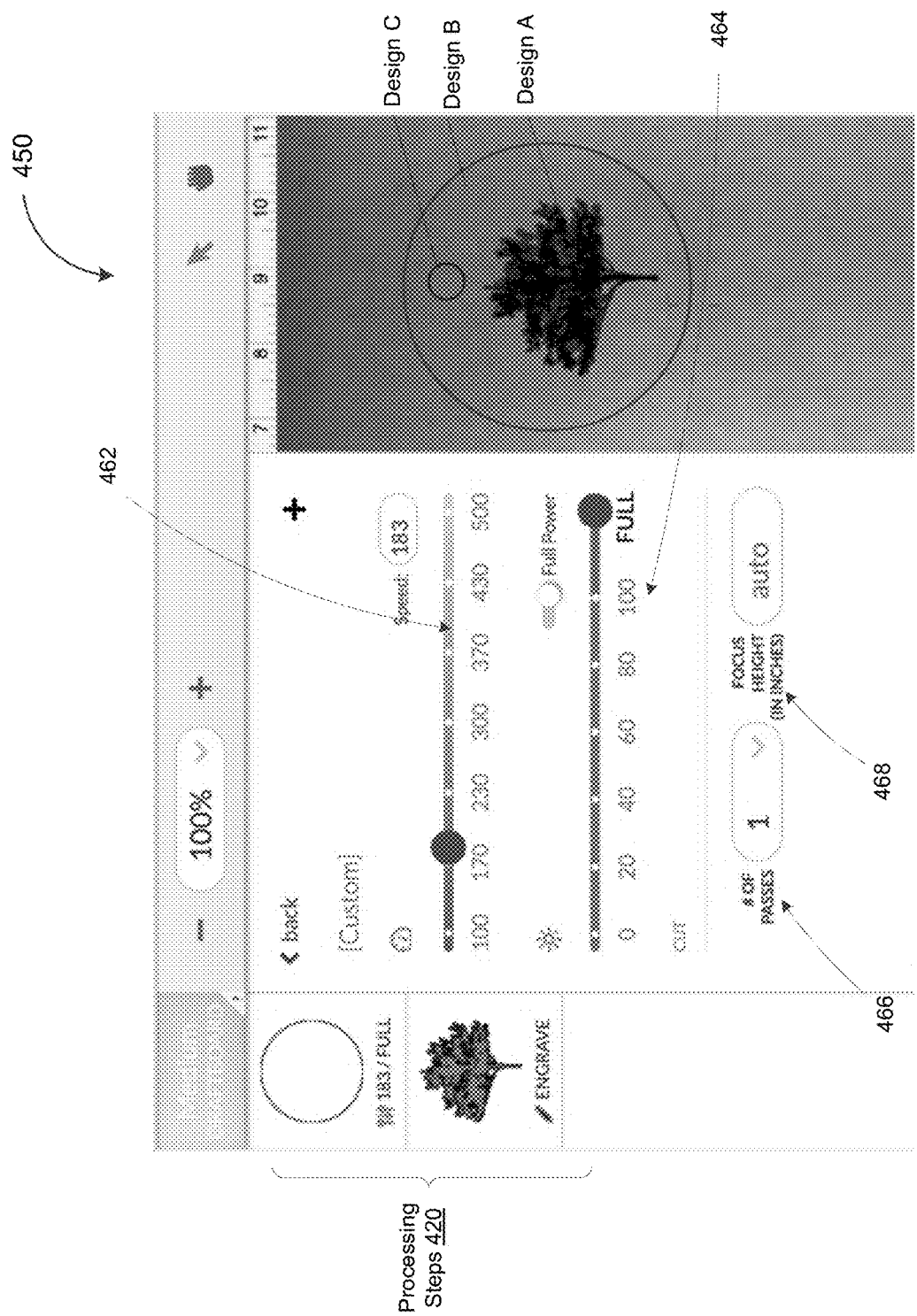
FIG. 4B depicts another example of a user interface for configuring a fabrication consistent with implementations of the current subject matter.

The controller 310 may receive one or more user inputs indicating additional settings for the fabrication such as, for example, a speed of the electromagnetic energy, a power of the electromagnetic energy, a quantity of passes to achieve the designs, a focus height of the electromagnetic energy (e.g., relative to a surface of the material 140), an order in which the designs are processed (e.g., engrave Design A first then cut Design C before cutting Design B), and/or the like. For example, FIG. 4B depicts another example of a user interface 450 for configuring a fabrication consistent with implementations of the current subject matter. The example of the user interface 450 shown in FIG. 4B includes one or more user interface elements (e.g., sliders, toggles, drop-down menus, and/or the like) for adjusting one or more fabrication settings such as, for example, the fabrication speed 462, the power of the electromagnetic energy 464, the quantity of passes to achieve the designs 466, the focus height of the electromagnetic energy 468, the processing steps 420, and/or the like.

In some implementations of the current subject matter, the controller 310 may perform a thermal verification to identify, based at least on the configurations of the fabrication, one or more potential thermal events that may occur during the processing of the material 140, for example, to achieve Design A, Design B, and Design C. It should be appreciated that the controller 310 may be configured to perform a thermal verification prior to initiating each fabrication and/or in response to a user request to perform a thermal verification for a specific fabrication.

The controller 310 may perform the thermal verification by performing one or more simulations of the fabrication in which the material 140 is processed to achieve Design A, Design B, and Design C. For example, the controller 310 may perform a time-variant simulation of the fabrication and/or a time-invariant simulation of the fabrication. As noted, to perform a time-invariant simulation of the fabrication, the controller 310 may use, for at least some parameters of the time-invariant simulation, values that have been determined in advance based on one or more time-variant simulations performed on a same or similar material as the material 140. In addition to the one or more simulations, the controller 310 may also perform an initial screening of the fabrication that includes verifying one or more key parameters of the fabrication. For instance, the controller 310 may identify overlapping lines in the fabrication as a cause for a potential thermal event.

The controller 310 may generate, based at least on a result of the one or more thermal simulations, one or more visualizations of the quantity of energy exposure across the material 140. The controller 310 may generate the one or more visualizations in response to determining that a thermal event is likely to occur during the processing of the material 140 and/or in response to a user request. One example of a visualization may include one or more heat maps depicting visual indicators of the quantity of energy exposure across the material 140. Alternatively and/or additionally, the controller 310 may generate a preview of an outcome of the processing of the material 140 that depicts the effects of any thermal events that may occur during the processing.

To provide a visualization of a time-variant simulation, the controller 310 may generate a sequence of heat maps including, for example, a first heat map providing a first visual indication of a first quantity of energy exposure at a first time during the fabrication and a second heat map providing a second visual indication of a second quantity of energy exposure at a second time during the fabrication, may be generated based on the result of a time-variant simulation. The sequence of heat maps depicting the quantities of energy exposure at successive points in time may be presented, for example, as an animation, to provide a visualization of the quantity of energy exposure across the material 140 over the course of the fabrication. Alternatively and/or additionally, the controller 310 may generate, based at least on the result of the time-variant simulation and/or a time-invariant simulation, one or more heat maps depicting a cumulative quantity of energy exposure across the material 140 over the course of processing the material 140.

Figure 5A:
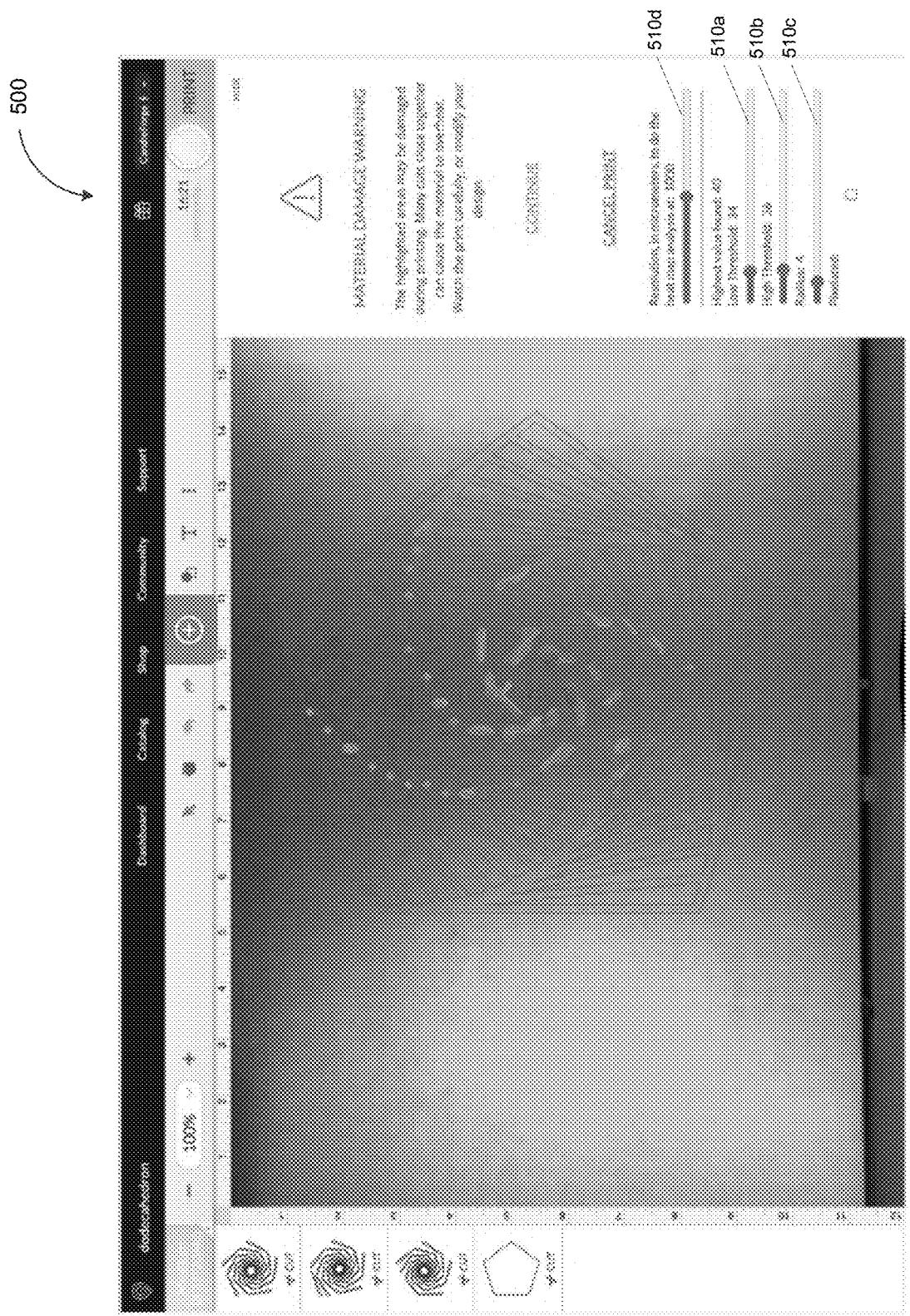
FIG. 5A depicts a user interface displaying an example of a heat map consistent with implementations of the current subject matter.
Figure 5B:
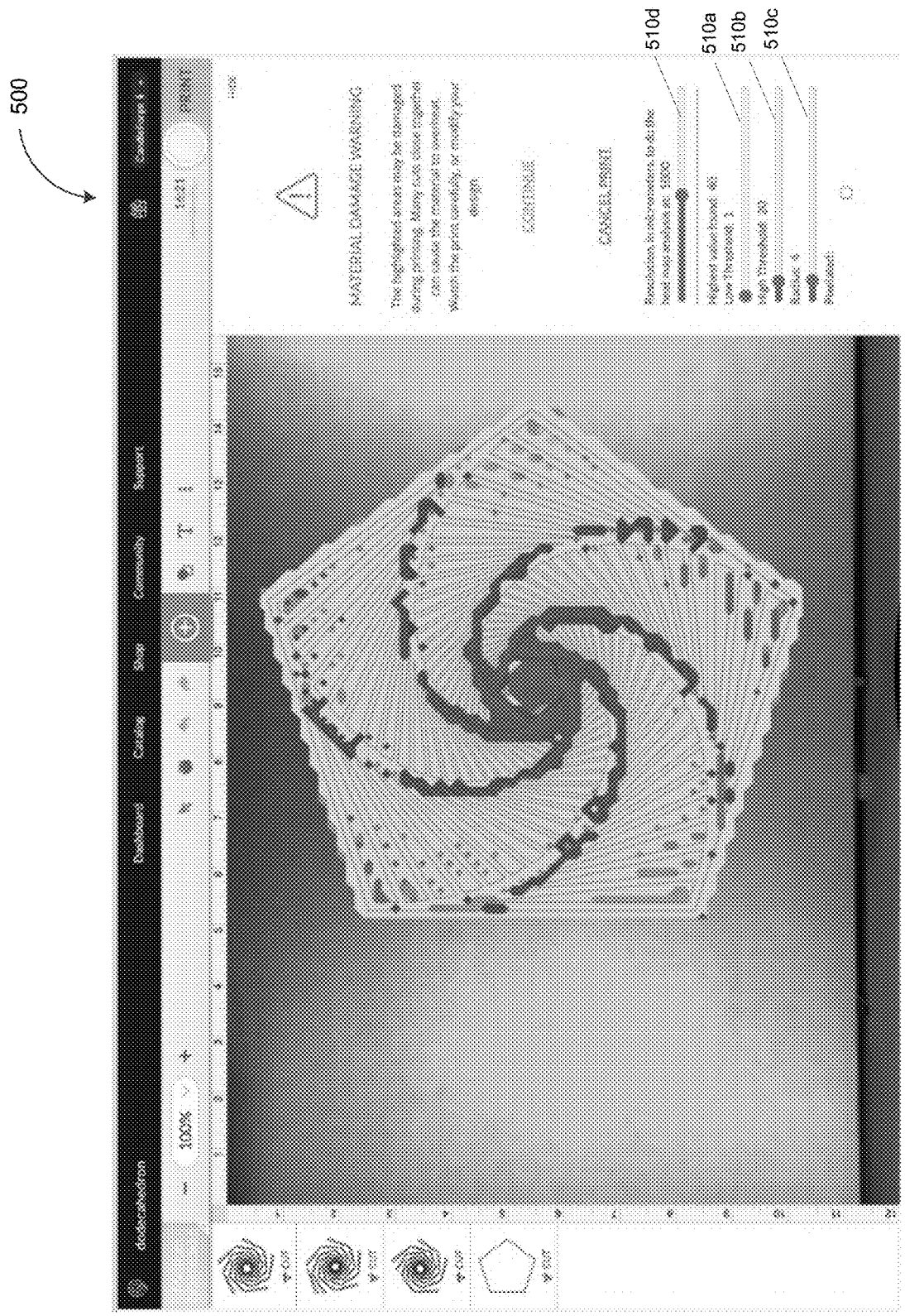
FIG. 5B depicts a user interface displaying another example of a heat map consistent with implementations of the current subject matter.
Figure 5C:
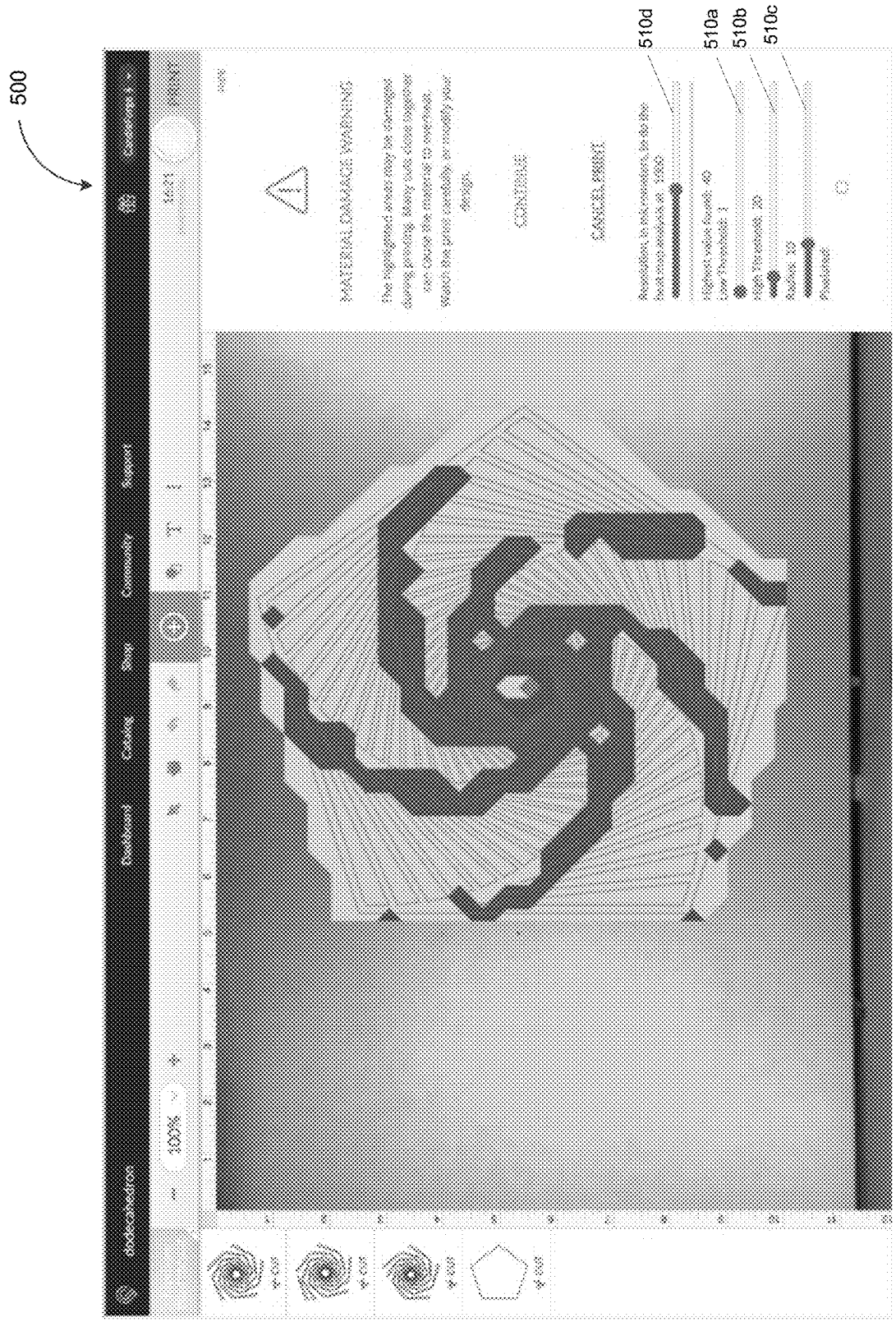
FIG. 5C depicts a user interface displaying another example of a heat map consistent with implementations of the current subject matter.

To further illustrate, FIGS. 5A-C depict a user interface 500 displaying different examples of heat maps consistent with implementations of the current subject matter. As shown in FIGS. 5A-C, each heat map may be generated to include, superimposed on top of one or more designs, visual indicators of the different quantities of energy exposure across the portions of the material 140 upon which the designs are placed.

For example, FIG. 5A depicts an example of a heat map including one or more visual indicators (e.g., different color highlights and/or the like) identifying one of more regions of the design on the material 140 at which a thermal event is determined to occur as a result of the processing of the material 140. As shown in FIG. 5A, the heat map may include a first visual indicator (e.g., a first color highlight and/or the like) identifying one or more regions of the material 140 at which energy exposure is above a first threshold value (e.g., a maximum quantity of energy exposure) and a second visual indicator (e.g., a second color highlight and/or the like) identifying one or more regions of the material 140 at which energy exposure is below a second threshold value (e.g., a minimum quantity of energy exposure).

FIG. 5B depicts another example of a heat map including one or more visual indicators of the various quantities of energy exposure across the design placed on the material 140. In addition to the first visual indicator (e.g., a first color highlight and/or the like) identifying one or more regions of the material 140 at which energy exposure is above the first threshold value (e.g., a quantity of maximum energy exposure) and the second visual indicator (e.g., a second color highlight and/or the like) identifying one or more regions of the material 140 at which energy exposure is below the second threshold value (e.g., a minimum quantity of energy exposure), the example of the heat map shown in FIG. 5B may further include a third visual indicator of the quantity of energy exposure at one or more other regions of the material 140.

As shown in FIGS. 5A-C, the user interface 500 may include one or more user interface elements (e.g., sliders, toggles, dropdown menus, and/or the like) configured to receive the user inputs adjusting one or more parameters of a time-variant simulation and/or a time-invariant simulation. As noted, the time-variant simulation may provide a reference or default value for one or more parameters of the corresponding time-invariant simulation as the predetermined values of at least some parameters of the time-invariant simulation may be subject to subsequent adjustments based on user inputs. Accordingly, in some implementations of the current subject matter, the user interface 500 may receive one or more inputs for adjusting the one or more parameters of a time-invariant simulation, which may be set initially to one or more default values form a corresponding time-variant simulation. In the example of the user interface 500 shown in FIGS. 5A-C, the user interface 500 may include a first slider 510a for adjusting a first thermal event threshold (e.g., maximum quantity of energy exposure), a second slider 510b for adjusting a second thermal event threshold (e.g., minimum quantity of energy exposure), a third slider 510c for adjusting a maximum aggregation radius, and a fourth slider 510d for adjusting a resolution at which an analysis of the corresponding visualization (e.g., heat map, preview, and/or the like).

Adjusting the values of one or more parameters of the a time-variant simulation or a time-invariant simulation may change the result of the simulation as well as the corresponding visualization (e.g., heat map, preview, and/or the like). For example, adjusting one or more of the first thermal event threshold (e.g., maximum energy exposure) and the second thermal event threshold (e.g., minimum energy exposure) may alter the quantity of thermal events indicated on the corresponding heat maps. Alternatively, adjusting the maximum aggregation radius of the heat map may change the resolution of the heat map. For instance, FIG. 5C depicts an example of the heat map in which the aggregation radius of the simulation is increased, for example, to match the charring that is expected for the type of the material 140 (e.g., ⅛ inch maple plywood).

Figure 6:
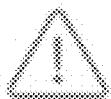
FIG. 6 depicts an example of an alert consistent with implementations of the current subject matter.

In some implementations of the current subject matter, in response to detecting one or more thermal events, such as one or more regions of the material that may overheat and/or underheat during the processing of the material 140, the controller 310 may generate an alert. FIG. 6 depicts an example of an alert 600 that the controller 310 may generate in response to the alert. As shown in FIG. 6, the alert 600 may indicate that one or more regions of the material 140 is susceptible to damage during the fabrication and include an option for the user to cancel the fabrication. In the example of the alert 600 shown in FIG. 6, the alert 600 may include the first slider 510a for adjusting a first thermal event threshold (e.g., maximum quantity of energy exposure), the second slider 510b for adjusting a second thermal event threshold (e.g., minimum quantity of energy exposure), and the third slider 510c for adjusting a maximum aggregation radius. The settings associated with the first slider 510a, the second slider 510b, and the third slider 510c may be displayed as part of the alert 600 in order to indicate at least some of the parameters associated with the thermal events. Moreover, as shown in FIG. 6, the alert 600 may include one or more values 610 associated with the thermal events such as, for example, a highest quantity of the energy exposure, a lowest quantity of energy exposure, an average quantity of energy exposure, and/or the like.

In addition to providing an alert and the option to cancel the fabrication, the controller 310 may also respond to the detection of thermal events by determining one or more corrective actions for resolving the thermal events. Examples of corrective actions may include minimizing the quantity of overlapping lines, monitoring the progress of the fabrication, increasing the distance between adjacent lines, decreasing the depth of the engraving, modifying the order in which designs are processed, generating a recommendation to modify the material 140, generating a recommendation of one or more alternate materials, modifying fan speeds to increase cooling and/or airflow, and modifying fabrication speed (e.g., to introduce "dwell time" to provide an opportunity for a cool down, to minimize debris, and/or the like). For instance, in cases where the processing of the material 140 is prone to produce debris (e.g., a paper material and/or like), the corrective actions may include adjusting the speed and/or the power of the electromagnetic energy such at least some cut portions of the material 140 do not fully detach during the processing of the material 140.

Figure 7:
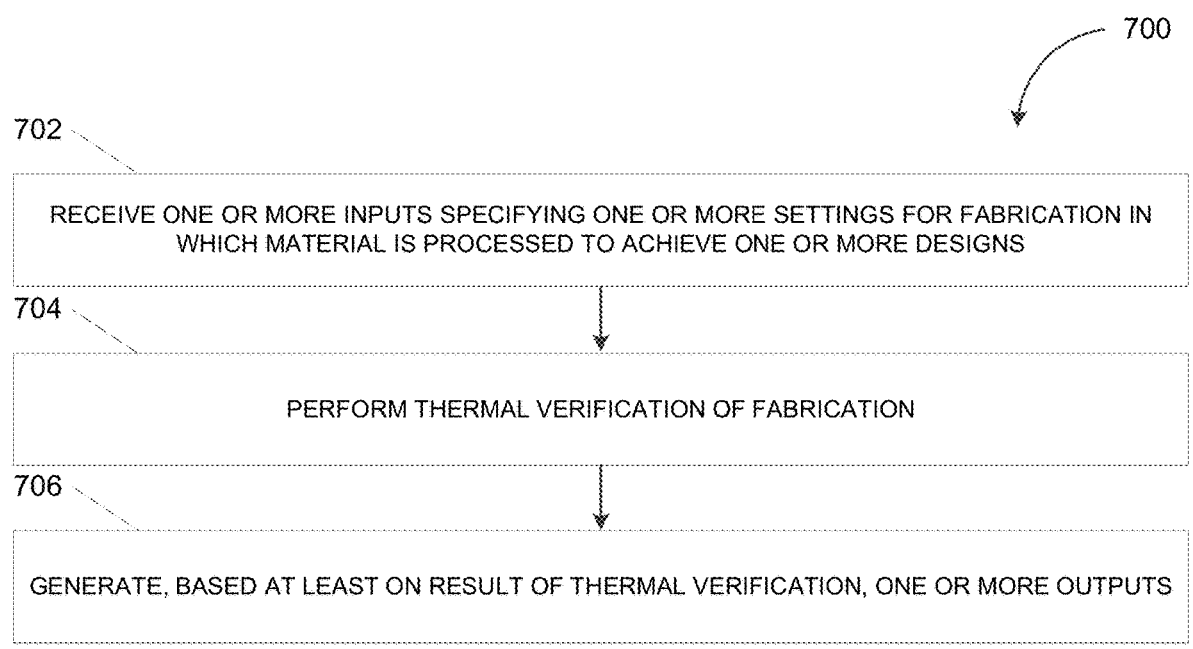
FIG. 7 depicts a flowchart illustrating another example of a process for computer numerically controlled processing with thermal verification consistent with implementations of the current subject matter.

FIG. 7 depicts a flowchart illustrating an example of a process 700 for computer numerically controlled processing with thermal verification consistent with implementations of the current subject matter. Referring to FIGS. 1-7, the process 700 may be performed by the controller 310, for example, at the computer numerically controlled machine 100, the server device 320, and/or the client device 330.

At block 702, the controller 310 may receive one or more inputs specifying one or more settings for a fabrication in which the material is processed to achieve one or more designs. For example, the controller 310 may receive one or more user inputs configuring a fabrication in which the material 140 is processed to achieve one or more designs such as, for example, Design A, Design B, and Design C shown in FIGS. 4A-B. The configuration for the fabrication may include a placement of Design A, Design B, and Design C on the material 140 as well as the type of processing (e.g., cut, engrave, and/or the like) associated with each design. Moreover, as shown in FIG. 4B, the controller 310 may receive, via the user interface 450, one or more user inputs indicating one or more settings for the fabrication such as, for example, a speed of the electromagnetic energy 462, a power of the electromagnetic energy 464, a quantity of passes 466 to achieve the designs, a focus height of the electromagnetic energy (e.g., relative to a surface of the material 140), one or more processing step 420 to indicate an order in which the designs are processed (e.g., engrave Design A first then cut Design C before cutting Design B), and/or the like.

At block 704, the controller 310 may perform a thermal verification of the fabrication. For example, the controller 310 may perform the thermal verification in response to the uploading of the one or more designs and/or in response to a user command to initiate the fabrication. In some cases, the controller 310 may be configured to perform thermal verification on a continuous or near-continuous basis, for example, in response to user inputs modifying the one or more designs.

In some implementations of the current subject matter, the controller 310 may assess the one or more designs included in the fabrication to determine whether the designs may trigger a thermal event during the processing of the material 140 to achieve the designs. In this context, it should be appreciated that the design may refer to the corresponding design file, graphic image, source file, machine file, motion plan (e.g., for moving the head 160 delivering the electromagnetic energy), and/or the like. That is, the controller 310 may perform a thermal verification of the designs included in a fabrication by at least evaluating the corresponding design files, graphic images, source files, machine files, motion plans (e.g., for moving the head 160 delivering the electromagnetic energy), and/or the like. Some designs, such as those with an excessive quantity of overlapping lines, may be more susceptible to thermal events.

In some implementations of the current subject matter, the controller 310 may also perform a more complex thermal verification by performing one or more simulations of the fabrication. The controller 310 may perform the one or more simulations if an analysis of the designs alone does not provide a sufficiently conclusive result. Alternatively and/or additionally, the controller 310 may perform the one or more simulations in response to a user request to do so. The controller 310 may perform a time-invariant simulation and/or a time-variant simulation. In addition to the designs being effected in the material 140, the one or more simulations of the fabrication may be configured to account for one or more additional factors including, for example, fabrication settings at the computer numerically controlled machine 100, characteristics of the material 140, ambient conditions, and/or the like. Moreover, as noted, the time-invariant simulation may be less complex and require less computational resources and/or time than a corresponding time-variant simulation at least because the time-invariant simulation may rely on one or more predetermined parameter values for the material 140 being processed.

At 706, the controller 310 may generate, based at least on a result of the thermal verification, one or more outputs. In some implementations of the current subject matter, the controller 310 may generate, based at least on the result of the thermal verification, one or more visualizations. For example, the controller 310 may generate one or more heat maps indicating the quantity of energy exposure across the material 140. Alternatively and/or additionally, the controller 310 may generate a preview of an outcome of the processing of the material 140 (e.g., as a projection or overlay superimposed on top of the designs and/or the material 140) that depicts the effects of any thermal events that may occur during the processing. The controller 310 may also identify, for example, through visual indicators and/or the like, one or more portions of the design file associated with the potential thermal events.

In the event the result of the thermal verification indicates a potential thermal event during the processing of the material 140, the controller 310 may also generate an alert. The controller 310 may also determine, based at least on the result of the thermal verification, one or more recommendations and/or corrective actions. For example, if the result of the thermal verification indicates that no thermal events will occur during the processing of the material 140, the controller 310 may generate a recommendation to proceed with the fabrication or may begin the fabrication automatically without providing any user notification. Alternatively, if the result of the thermal verification indicates one or more potential thermal events, the controller 310 may cancel the fabrication, generate a recommendation to cancel the fabrication, and/or provide one or more corrective actions for resolving the thermal events. One example of corrective actions may include design modifications, for example, minimizing the quantity of overlapping lines, increasing the distance between adjacent lines, decreasing the depth of the engraving, and/or the like. Another example of corrective actions may include modifications to the fabrication plan such as changing the order in which designs are processed and/or adjusting the fabrication speed (e.g., to introduce "dwell time" to provide an opportunity for a cool down, to minimize debris, and/or the like). Yet another example of corrective actions may include a recommendation to modify the material 140 to be used for the fabrication and/or a recommendation of one or more suitable materials for the fabrication. Corrective actions may also include instructions for the user to monitor the progress of the fabrication. In some instances, if the corrective actions may be performed without any user intervention to resolve the potential thermal events, the controller 310 may perform the corrective actions before starting the fabrication automatically without providing any user notification.

Figure 8:
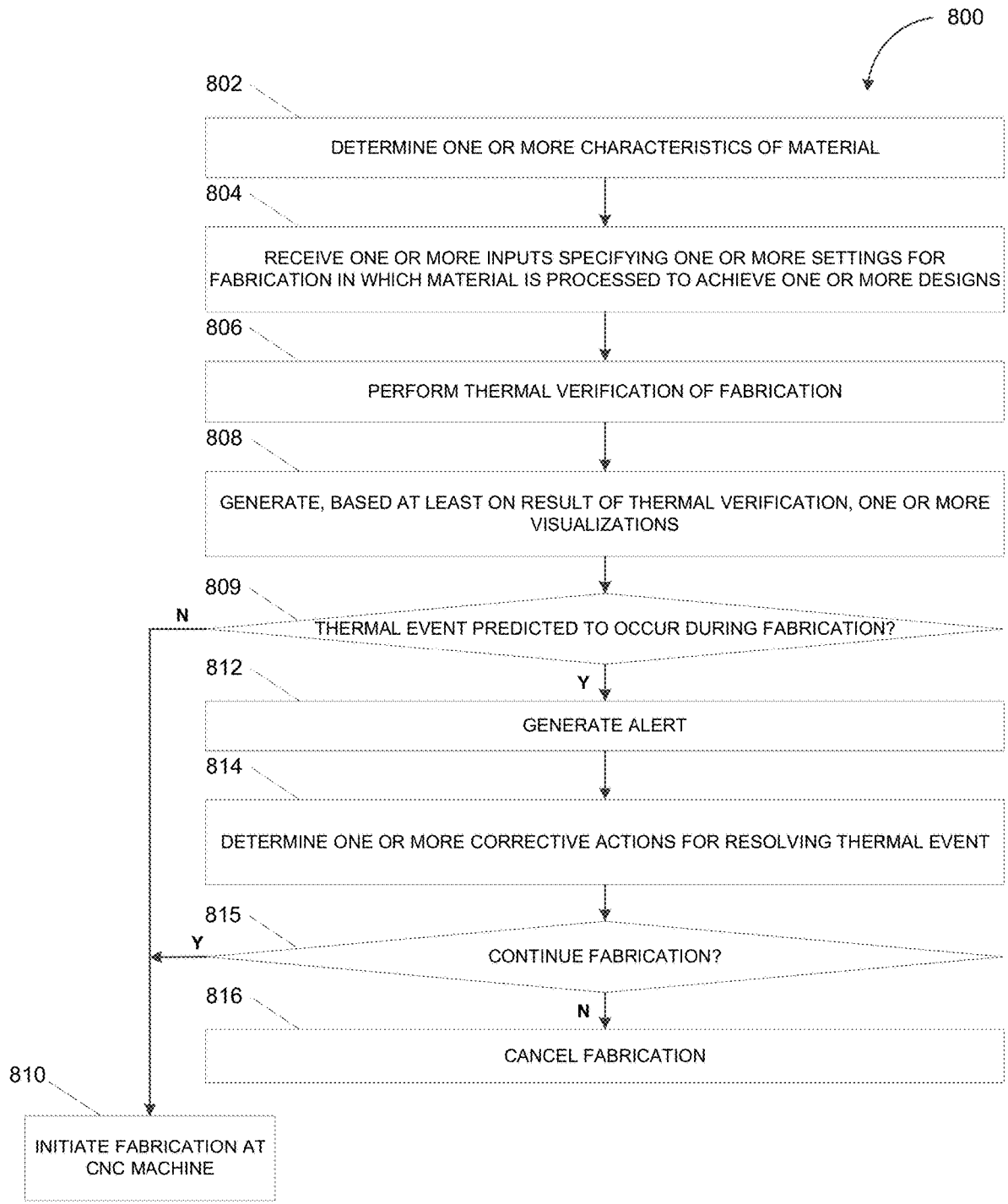
FIG. 8 depicts a flowchart illustrating another example of a process for computer numerically controlled processing with thermal verification consistent with implementations of the current subject matter.

FIG. 8 depicts a flowchart illustrating an example of a process 800 for computer numerically controlled processing with thermal verification consistent with implementations of the current subject matter. Referring to FIGS. 1-8, the process 800 may be performed by the controller 310, for example, at the computer numerically controlled machine 100, the server device 320, and/or the client device 330.

At block 802, the controller 310 may determine one or more characteristics of a material. In some implementations of the current subject matter, the controller 310 may apply one or more techniques to identify one or more characteristics of the material 140. For example, the controller 310 may identify one or more characteristics of the material 140 based on one or more user inputs specifying, for example, the type of the material 140, the thickness of the material 140, the density of the material 140, and/or the like. Alternatively and/or additionally, the controller 310 may identify one or more characteristics of the material 140 based on an identifier on the material 140 (e.g., a Quick Response (QR) code, a stock keeping unit (SKU) code, a barcode, and/or the like). For instance, the identifier on the material 140 may be scanned (e.g., by one or more sensors at the computer numerically controlled machine 100) before the characteristics of the material 140 are retrieved based on the scan of the identifier 140. The controller 310 may also identify one or more characteristics of the material 140 based on data from one or more sensors (e.g., cameras, position sensors, and/or the like) at the computer numerically controlled machine 100. For instance, the type of the material 140 may be determined based on how the material 140 responds to an electromagnetic energy from a laser or a non-laser source at the computer numerically controlled machine 100.

At block 804, the controller 310 may receive one or more inputs specifying one or more settings for a fabrication in which the material is processed to achieve one or more designs. For example, the controller 310 may receive one or more user inputs configuring a fabrication in which the material 140 is processed to achieve one or more designs such as, for example, Design A, Design B, and Design C shown in FIGS. 4A-B. The configuration for the fabrication may include a placement of Design A, Design B, and Design C on the material 140 as well as the type of processing (e.g., cut, engrave, and/or the like) associated with each design. Moreover, as shown in FIG. 4B, the controller 310 may receive, via the user interface 450, one or more user inputs indicating one or more settings for the fabrication such as, for example, a speed of the electromagnetic energy 462, a power of the electromagnetic energy 464, a quantity of passes to achieve the designs 466, a focus height of the electromagnetic energy 468 (e.g., relative to a surface of the material 140), one or more processing step 420 to indicate an order in which the designs are processed (e.g., engrave Design A first then cut Design C before cutting Design B), and/or the like.

At block 806, the controller 310 may perform a thermal verification of the fabrication. In some implementations of the current subject matter, the controller 310 may perform one or more of a time-variant simulation and a time-invariant simulation in order to determine whether one or more thermal events may occur during the fabrication, for example, to achieve Design A, Design B, and Design C on the material 140. This thermal verification may be performed automatically (e.g., in response to a fabrication command from the user) or triggered by a specific user command to perform the thermal verification. As noted, a thermal event may occur when one or more regions of the material 140 is exposed to an unsuitable or undesirable quantity of electromagnetic energy (e.g., more than a maximum quantity of energy exposure, less than a minimum quantity of exposure, and/or the like) during the processing of the material 140. Accordingly, the one or more time-variant simulations and/or time-invariant simulations may be performed in order to determine the quantity of energy exposure across the material 140. One or more thermal event thresholds may be set to indicate suitable and/or desirable range of energy exposure. These thermal event thresholds may be specific to the material 140 since some materials may tolerate or require more (or less) energy than other materials. Alternatively and/or additionally, these thermal event thresholds may also be user and/or design specific as some users or designs may require the material 140 to be processed to achieve a char in one or more regions of the material 140.

At block 808, the controller 310 may generate, based at least on a result of the thermal verification, one or more visualizations. For example, as shown in FIGS. 5A-C, the controller 310 may generate one or more heat maps providing a visualization of the quantity of energy exposure across the material 140. Each heat map may be generated to include, superimposed on top of one or more designs, visual indicators of the different quantities of energy exposure across the portions of the material 140 upon which the designs are placed. In some cases, such as shown in FIG. 5A, the heat map may be generated to include one or more visual indicators (e.g., different color highlights and/or the like) identifying one of more regions of the design on the material 140 at which a thermal event is determined to occur as a result of the processing of the material 140. Alternatively and/or additionally, FIG. 5B depicts another example of the heat map that includes one or more visual indicators of the various quantities of energy exposure across the design placed on the material 140. As noted, adjusting one or more parameters of the fabrication, such as the thermal event thresholds and/or the maximum aggregation radius, may trigger one or more changes in the corresponding heat maps.

Instead of and/or in addition to the one or more heat maps, the controller 310 may also generate a preview of an outcome of the processing of the material 140. In instances where the result of the thermal verification indicates an occurrence of one or more thermal events during the processing of the material 140, the preview may depict one or more regions of the material 140 where the outcome of the processing of the material 140 is inconsistent with an intended final appearance of the material 140 due to the occurrence of thermal events. For example, to depict one or more regions of the material 140 that may be subject to excessive or insufficient charring, the outcome of the processing may be projected or overlaid on top of the designs being effected in the material 140 and/or the material 140 itself. For example, the outcome of the processing may be superimposed on top of Design A, Design B, and Design C along one or more features of the material 140 such as patterns, surface textures (e.g., wood grain), and/or the like. Moreover, in some implementations of the current subject matter, the preview may include one or more visual indicators to highlight those regions of the material 140 where the outcome of the processing is inconsistent with the intended final appearance of the material 140. It should be appreciated that the generating of the one or more visualizations may be optional. For instance, the controller 310 may omit generating the one or more visualizations or may generate the one or more visualizations only if the result of the thermal verification indicates that a thermal event is likely to occur during the processing of the material 140.

At block 809, the controller 310 may predict, based at least on the result of the thermal verification, whether a thermal event is likely to occur during the fabrication. For example, the controller 310 may determine a likelihood (e.g., a probability and/or the like) of one or more thermal events occurring during the processing of the material. At 809-N, the controller 310 may determine that no thermal events occur during the fabrication. As such, At block 810, the controller 310 may initiate, at the computer numerically controlled machine 100, the fabrication to process the material to achieve the one or more designs. In some implementations of the current subject matter, the result of the time-variant simulation and/or the time-invariant simulation may indicate that no thermal event will occur during the processing of the material 140. This determination may be based on the quantity of energy exposure across the material 140 being consistent with one or more thermal event thresholds (e.g., above a minimum energy exposure and below a maximum energy exposure). When no thermal events are determined to occur during the processing of the material 140, the controller 110 may initiate the actual fabrication such that the computer numerically controlled machine 100 may proceed with processing the material 140 to achieve the one or more designs.

Alternatively, at 809-Y, the controller 310 may detect the occurrence of at least one thermal event during the fabrication. Accordingly, At block 812, the controller 310 may generate an alert. Furthermore, At block 814, the controller 310 may determine one or more corrective actions for resolving the thermal event. In some implementations of the current subject matter, when the controller 310 detects one or more potential thermal events during the processing of the material 140, the controller 310 may be configured to trigger an alert, such as the alert 600, for display at one or more of the computer numerically controlled machine 100, the server device 320, and the client device 330. In addition to the alert, the controller 310 may also determine one or more corrective actions for resolving the thermal events. As noted, examples of corrective actions may include minimizing the quantity of overlapping lines, monitoring the progress of the fabrication, increasing the distance between adjacent lines, decreasing the depth of the engraving, modifying the order in which designs are processed, and modifying fabrication speed (e.g., to introduce "dwell time" to provide an opportunity for a cool down, to minimize debris, and/or the like).

At block 815, the controller 310 may determine, based on one or more user inputs, whether to continue the fabrication. At 815-Y where the controller 310 determines to continue the fabrication process, the process 700 may resume at block 710 and the controller 310 may initiate, at the computer numerically controlled machine 100, the fabrication to process the material to achieve the one or more designs. Alternatively, at 815-N, the controller 310 may determine to not continue the fabrication process. At block 816, the controller 310 may cancel the fabrication. In some implementations of the current subject matter, the controller 310 may provide the user with an option to cancel the fabrication, particularly a fabrication that is determined to cause one or more thermal events. Accordingly, upon presenting the alert and/or the corrective actions, the controller 310 may determine, based at least on one or more user inputs, whether to proceed with the fabrication. For example, the controller 310 may initiate the fabrication at the computer numerically controlled machine 100 if the controller 310 receives an indication from the user to continue with the fabrication. Contrastingly, the controller 310 may abort the fabrication if the controller 310 receives an indication from the user to cancel the fabrication.

Figure 9:
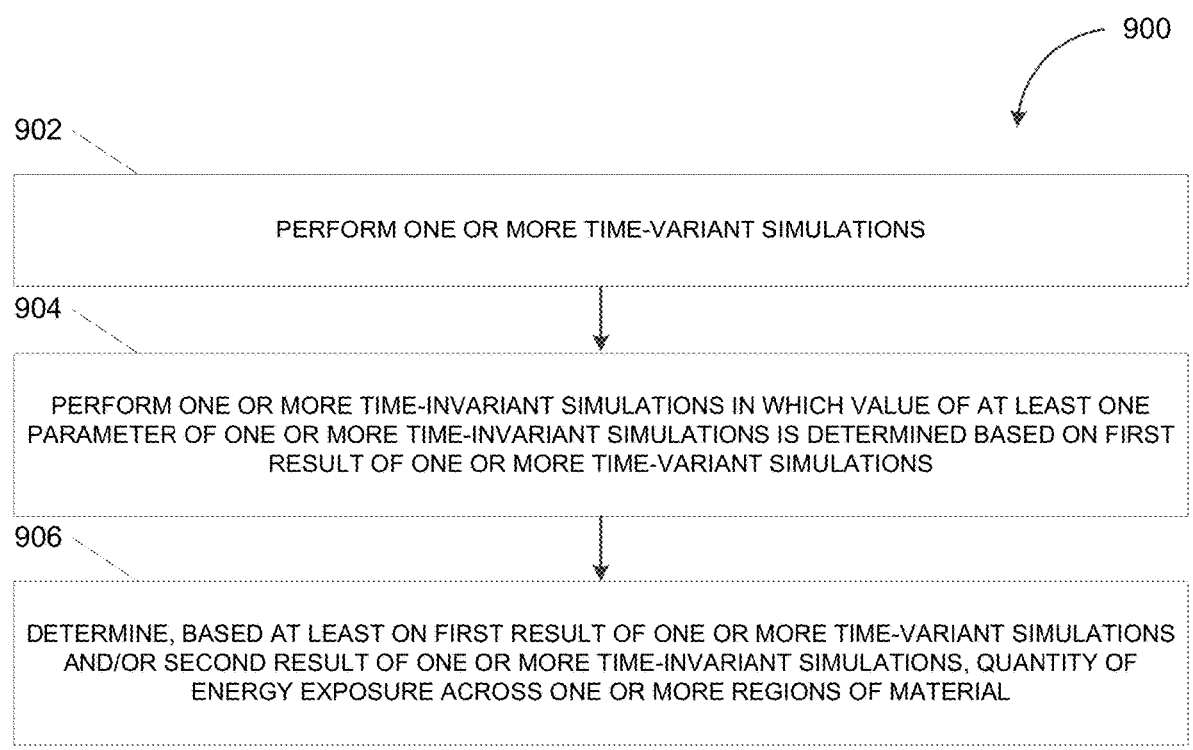
FIG. 9 depicts a flowchart illustrating an example of a process for thermal verification consistent with implementations of the current subject matter.

FIG. 9 depicts a flowchart illustrating an example of a process 900 for thermal verification consistent with implementations of the current subject matter. Referring to FIGS. 1-9, the process 800 may be performed by the controller 310, for example, at the computer numerically controlled machine 100, the server device 320, and/or the client device 330. Moreover, the controller 310 may perform the process 800 to implement block 704 of the process 700 and/or block 806 of the process 800.

At block 902, the controller 310 may perform one or more time-variant simulations. In some implementations of the current subject matter, the controller 310 may perform one or more time-variant simulations in order to assess how the material 140 responds to the processing to achieve one or more designs. Alternatively and/or additionally, the controller 310 may perform the one or more time-variant simulations for a reference material that is the same as or similar to the material 140 such that the results of these time-variant simulations may subsequently be used to inform time-invariant simulations for the material 140.

As noted, the time-variant simulations take into account a variety of factors including, for example, the power of the electromagnetic energy delivered (e.g., full power or a fraction of full power), ambient temperature (e.g., to model convective heat loss from air circulation), convection coefficient of the material and ambient air (e.g., a unit of heat flux measured in $$\frac{\text{Power}}{(\text{Area} \times \text{Temperature})}),$$

thickness of the material (e.g., to model simulation cell boundary area), density, molar mass, and specific heat of the material (e.g., to create an energy relationship with respect to temperature), enthalpy and temperature of phase change (e.g., to model the nonlinearity in specific heat), spot distribution sigma of the electromagnetic energy (e.g., to model the intensity of the electromagnetic energy on individual cells using a probability distribution such as Gaussian distribution), and/or the like.

At block 904, the controller 310 may perform one or more time-invariant simulations in which the value of at least one parameter for the one or more time-invariant simulations is determined based at least on a first result of the one or more time-variant simulations. In some implementations of the current subject matter, the controller 310 may also perform one or more time-invariant simulations of the processing of the material 140. As noted, time-invariant simulations may be less complex and require less computational resources and/or time than a corresponding time-variant simulation. Accordingly, the controller 310 may perform one or more time-invariant simulations when the performance of a time-variant simulation is inefficient or impracticable.

To perform the one or more time-invariant simulations, the controller 310 may use one or more parameter values that have been determined in advance based on one or more time-variant simulations performed, for example, on a same or similar material as the material 140. The values of the parameters used for the time-invariant simulation may vary based on the type of the material 140. For example, the controller 310 may apply a first set of predetermined parameter values for ⅛ inch maple hardwood and a second set of predetermined parameter values for ⅛ inch maple plywood. Moreover, examples of the parameters whose may be determined in advance by performing one or more time-variant simulations may include maximum aggregation radius, thermal event thresholds, spot distribution sigma of the electromagnetic energy, simulation cell dimension, quantum of energy exposure, and nominal power of electromagnetic energy.

At block 906, the controller 310 may determine, based at least on the first result of the one or more time-variant simulations and/or a second result of the one or more time-invariant simulations, a quantity of energy exposure across one or more regions of a material. In some implementations of the current subject matter, the results of the time-variant simulation and/or the time-invariant simulation may indicate the quantity of energy that the material 140 is exposed to during the processing to achieve the one or more designs. In the case of the time-variant simulations, the result may include the quantity of energy exposure across the material 140 at successive points in time during the processing of the material 140. For time-invariant simulations, the result may include a cumulative quantity of energy exposure across the material 140 over the course of processing the material 140. As noted, the controller 310 may generate, based at least on the results of one or more time-variant simulations and/or time-invariant simulations, a corresponding visualization including, for example, one or more heat maps, a preview of the outcome of the processing of the material 140, and/or the like.

Figure 10:
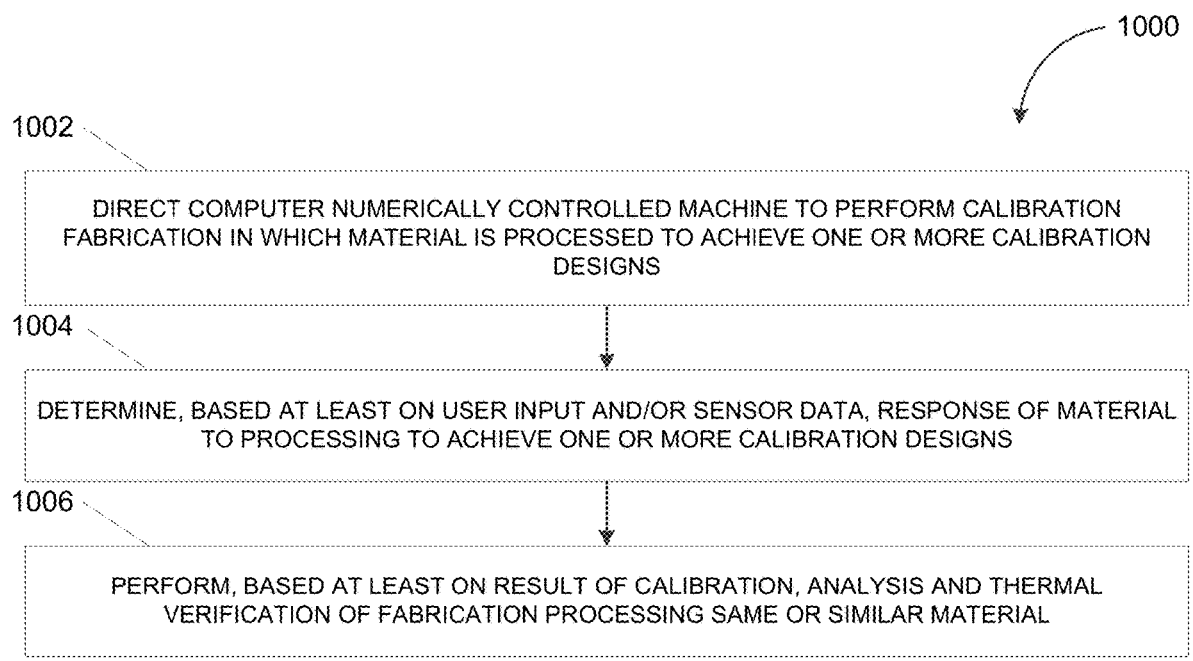
FIG. 10 depicts a flowchart illustrating an example of a process for thermal calibration consistent with implementations of the current subject matter.

FIG. 10 depicts a flowchart illustrating an example of a process 1000 for thermal calibration consistent with implementations of the current subject matter. Referring to FIGS. 1-10 and 11A-D, the process 1000 may be performed by the controller 310, for example, at the computer numerically controlled machine 100, the server device 320, and/or the client device 330.

At block 1002, the controller 310 may direct the computer numerically controlled machine 100 to perform a calibration fabrication in which a material is processed to achieve one or more calibration designs. For example, to perform a thermal calibration to determine how the material 140 responds to different processing, the controller 310 may direct the computer numerically controlled machine 100 to perform a calibration fabrication in which the material 140 is processed to achieve the design 1150, which may be a spiral in which each successive turn is slightly closer than the preceding turn. The design 1150 may be configured to facilitate an identification of the location at which one or more thermal events have occurred. For instance, one or more thermal events may occur at an area of the material 140 where the spacing between successive turns of the spiral forming the design 1150 is sufficiently small.

At block 1004, the controller 310 may determine, based at least on a user input and/or a sensor data, a response of the material to the processing to achieve the one or more calibration designs. For example, when the calibration fabrication is complete, a user and/or a sensor (e.g., a camera and/or the like) may identify the one or more thermal events based on the scorching that may be present in the material 140 (and/or another undesirable response in the material 140). Moreover, the user and/or the sensor may determine the one or more locations of the one or more thermal events based on the turn in the spiral at which the scorching occurred.

As noted, thermal calibration may be performed such that one or more parameters of time-variant simulations and/or time-invariant simulations performed for the computer numerically controlled machine 100 may be adapted based on actual data generated at the computer numerically controlled machine 100. For example, thermal calibration may be performed in response to the occurrence of a thermal event during the processing of the material 140 at the computer numerically controlled machine 100. In response to the occurrence of the thermal event during the processing of the material 140, the controller 310 may perform a thermal calibration including by directing one or more sensors (e.g., cameras and/or the like) at the computer numerically controlled machine 100 to capture one or more images of the material 140. The controller 310 may further analyze the images to determine, based at least on the thermal artifacts present in the material 140, the corresponding parameters for subsequent simulations performed for the computer numerically controlled machine 100.

Alternatively and/or additionally, the controller 310 may perform thermal calibration in order for a user to establish one or more custom thermal artifacts. For example, in order to be consistent with the intended final appearance of the material 140, the computer numerically controlled machine 100 may be required to achieve a char in one or more regions of the material 140. The user may therefore define one or more custom thermal artifacts such that the deliberate charring of the material 140 does not constitute a thermal event that triggers a warning and/or corrective actions.

At block 1006, the controller 310 may perform, based at least on a result of the calibration, an analysis and thermal verification of a fabrication to process a same or similar material. In some implementations of the current subject matter, the controller 310 may perform thermal calibration in order to obtain actual data generated at the computer numerically controlled machine 100 for the material 140. One or more parameters of time-variant simulations and/or time-invariant simulations to predict how the material 140 (or a same and/or similar material) to subsequent processing by the computer numerically controlled machine 100 to achieve one or more designs given one or more settings at the computer numerically controlled machine 100 and/or one or more characteristics of the material 140 may be determined based on the actual data that is obtained as a result of the thermal calibration. For example, at least some of the parameters used to perform the analysis and thermal verification described in process 800 of FIG. 8 may be determined based on the result of the thermal calibration.

Figure 12:
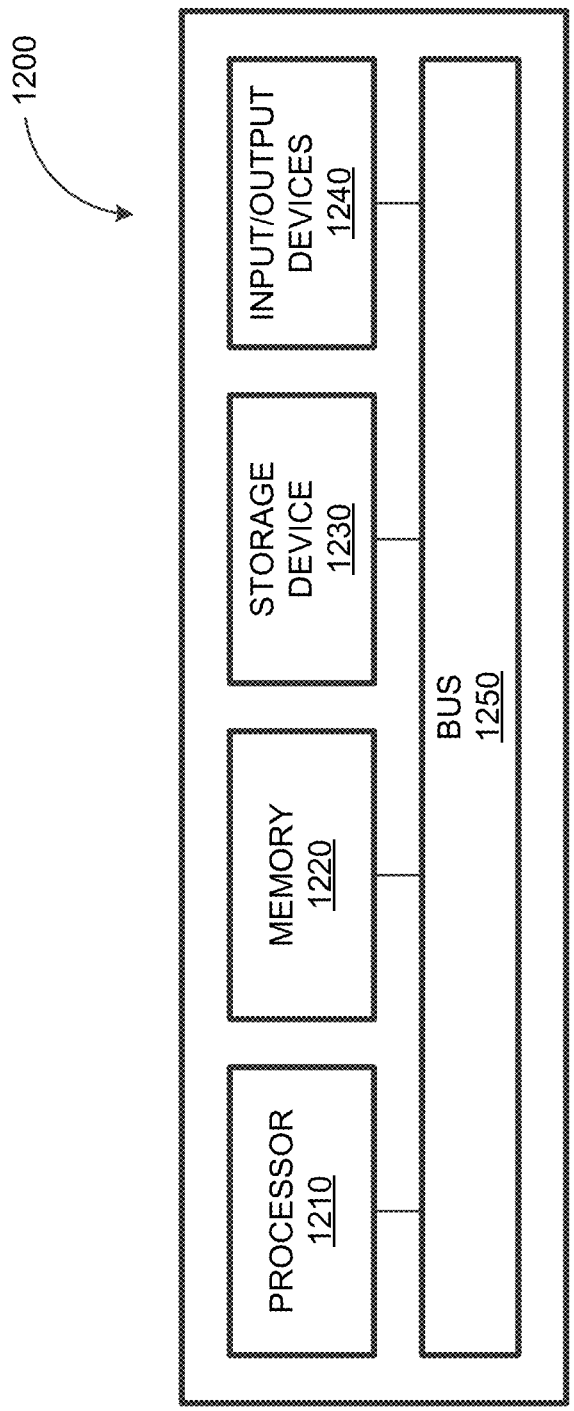
FIG. 12 depicts a block diagram illustrating a computing system, consistent with implementations of the current subject matter.

FIG. 12 depicts a block diagram illustrating a computing system 1200, consistent with implementations of the current subject matter. Referring to FIGS. 1-12, the computing system 1200 may implement one or more of the first controller 310a at the computer numerically controlled machine 100, the second controller 310b at the server device 320, the third controller 310c at the client device 330, and/or any components therein.

As shown in FIG. 12, the computing system 1200 can include a processor 1210, a memory 1220, a storage device 1230, and an input/output device 1240. The processor 1210, the memory 1220, the storage device 1230, and the input/output device 1240 can be interconnected via a system bus 1250. The processor 1210 is capable of processing instructions for execution within the computing system 1200. Such executed instructions can implement one or more components of, for example, the computer numerically controlled machine 100, the server device 320, and/or the client device 330. In some implementations of the current subject matter, the processor 1210 can be a single-threaded processor. Alternately, the processor 1210 can be a multi-threaded processor. The processor 1210 is capable of processing instructions stored in the memory 1220 and/or on the storage device 1230 to control at least some of the operations of the computer numerically controlled machine 100.

The memory 1220 is a computer readable medium such as volatile or non-volatile that stores information within the computing system 1200. The memory 1220 can store data structures representing configuration object databases, for example. The storage device 1230 is capable of providing persistent storage for the computing system 1200. The storage device 1230 can be a solid state drive, a floppy disk device, a hard disk device, an optical disk device, or a tape device, or other suitable persistent storage means. The input/output device 1240 provides input/output operations for the computing system 1200. In some implementations of the current subject matter, the input/output device 1240 can provide input/output operations for a network device. For example, the input/output device 1240 can include Ethernet ports or other networking ports to communicate with one or more wired and/or wireless networks (e.g., a local area network (LAN), a wide area network (WAN), the Internet).

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include client devices and server devices. A client device and server device are generally remote from each other and typically interact through a communication network. The relationship of client device and server device arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

In some examples, at least one of the components carrying out the functions described in the blocks of a block diagram is implemented by a logic circuit. As used herein, the term "logic circuit" is expressly defined as a physical device including at least one hardware component configured (e.g., via operation in accordance with a predetermined configuration and/or via execution of stored machine-readable instructions) to control one or more machines and/or perform operations of one or more machines. Examples of a logic circuit include one or more processors, one or more coprocessors, one or more microprocessors, one or more controllers, one or more digital signal processors (DSPs), one or more application specific integrated circuits (ASICs), one or more field programmable gate arrays (FPGAs), one or more microcontroller units (MCUs), one or more hardware accelerators, one or more special-purpose computer chips, and one or more system-on-a-chip (SoC) devices. Some example logic circuits, such as ASICs or FPGAs, are specifically configured hardware for performing operations (e.g., one or more of the operations described herein and represented by the flowcharts of this disclosure, if such are present). Some example logic circuits are hardware that executes machine-readable instructions to perform operations (e.g., one or more of the operations described herein and represented by the flowcharts of this disclosure, if such are present). Some example logic circuits include a combination of specifically configured hardware and hardware that executes machine-readable instructions.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on,"

above and in the claims is intended to mean, "based at least on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

The description provided herein refers to block diagrams and other accompanying drawings. Alternative implementations of the example represented by the block diagram may include one or more additional or alternative elements, processes and/or devices. Additionally or alternatively, one or more of the example blocks of the diagrams may be combined, divided, re-arranged or omitted.

The description provided herein refers to various operations, and flowcharts that may be appended hereto to illustrate the flow of those operations. Although the blocks are illustrated in sequential order, the actions indicated by the blocks may in some embodiments be performed in parallel, and/or in a different order than those described herein. Also, the various blocks may be combined into fewer blocks, divided into additional blocks, and/or removed based upon the desired implementation. Any such flowcharts are representative of example methods disclosed herein. In some examples, the methods represented by the flowcharts may be implemented by the apparatus represented by the block diagrams. Alternative implementations of example methods disclosed herein may include additional or alternative operations. Further, operations of alternative implementations of the methods disclosed herein may combined, divided, re-arranged or omitted. In some examples, the operations described herein are implemented by machine-readable instructions (e.g., software and/or firmware) stored on a medium (e.g., a tangible machine-readable medium) for execution by one or more logic circuits (e.g., processor(s)). In some examples, the operations described herein are implemented by one or more configurations of one or more specifically designed logic circuits (e.g., ASIC(s)). In some examples the operations described herein are implemented by a combination of specifically designed logic circuit(s) and machine-readable instructions stored on a medium (e.g., a tangible machine-readable medium) for execution by logic circuit(s).

What is claimed is:

1. A system, comprising:
    at least one processor;
    at least one non-transitory computer-readable medium; and
    program instructions collectively stored on the at least one non-transitory computer-readable medium that are executable by the at least one processor such that the system is configured to:
        receive one or more configurations for a fabrication process during which a computer numerically controlled (CNC) machine delivers an electromagnetic energy configured to effect, in a material, one or more changes consistent with one or more designs, the one or more configurations including (i) a design file corresponding to the one or more designs, (ii) one or more characteristics of the material, and (iii) one or more settings of the CNC machine;
        receive an input indicating a command to cause the CNC machine to begin the fabrication process;
        prior to causing the CNC machine to begin the fabrication process, determine, based on an analysis of the one or more configurations, whether a thermal event is likely to occur during the fabrication process, the thermal event corresponding to one or more regions of the material exhibiting a change that is inconsistent with the one or more designs in response to the electromagnetic energy being delivered to the material, wherein the analysis of the one or more configurations includes performing one or more simulations of the fabrication process to thereby determine a cumulative quantity of energy exposure across the material and/or a quantity of energy exposure across the material at successive points in time during the fabrication process;
        based on determining that a thermal event is not likely to occur during the fabrication process, execute the command to cause the CNC machine to begin the fabrication process; and
        based on determining that a thermal event is likely to occur during the fabrication process, (i) refrain from executing the command to cause the CNC machine to begin the fabrication process and (ii) generate a visual preview of the one or more designs, where the visual preview of the one or more designs shows a predicted final appearance of the material resulting from the CNC machine performing the fabrication process, including a heat map for the design that indicates the one or more regions of the material corresponding to the thermal event.

2. The system of claim 1, further comprising program instructions stored on the at least one non-transitory computer-readable medium that are executable by the at least one processor such that the system is configured to:
    perform a calibration fabrication to thereby determine a value of at least one parameter of the one or more simulations, wherein the calibration fabrication is performed on the material and/or a different piece of a same or similar material.

3. The system of claim 2, wherein the program instructions stored on the at least one non-transitory computer-readable medium that are executable by the at least one processor such that the system is configured to determine the value of the at least one parameter comprise program instructions stored on the at least one non-transitory computer-readable medium that are executable by the at least one processor such that the system is configured to determine the value of the at least one parameter based on (i) one or more images of the material captured subsequent to the calibration fabrication, (ii) the one or more settings of the CNC machine, (iii) the one or more characteristics of the material, and/or (iv) a user input identifying a region of the one or more regions of the material exhibiting the change that is inconsistent with the one or more designs subsequent to the calibration fabrication.

4. The system of claim 1, wherein the analysis of the one or more configurations includes:
- determining whether a surface area of the material and/or changes to the surface area of the material as a result of the fabrication process increases a likelihood of the thermal event.

5. The system of claim 1, wherein the change that is inconsistent with the one or more designs in response to the electromagnetic energy being delivered to the material is determined automatically and/or based on a user input.

6. The system of claim 1, wherein the analysis of the one or more configurations is performed at the CNC machine, a client device communicatively coupled with the CNC machine, and/or a server communicatively coupled with the CNC machine.

7. The system of claim 1, further comprising program instructions stored on the at least one non-transitory computer-readable medium that are executable by the at least one processor such that the system is configured to:
- identify, based at least on (i) a user input, (ii) an identifier associated with the material, and/or (iii) data from one or more sensors at the CNC machine, the one or more characteristics of the material.

8. The system of claim 1, further comprising program instructions stored on the at least one non-transitory computer-readable medium that are executable by the at least one processor such that the system is configured to:
- determine at least one corrective action to address the thermal event, wherein the at least one corrective action includes modifying at least one of (i) the design file, (ii) the one or more characteristics of the material, or (iii) the one or more settings of the CNC machine.

9. The system of claim 1, further comprising program instructions stored on the at least one non-transitory computer-readable medium that are executable by the at least one processor such that the system is configured to:
- receive a user input to begin the fabrication process; and
- wherein the program instructions stored on the at least one non-transitory computer-readable medium that are executable by the at least one processor such that the system is configured to determine, based on the analysis of the one or more configurations, whether the thermal event is likely to occur during the fabrication process comprise program instructions stored on the at least one non-transitory computer-readable medium that are executable by the at least one processor such that the system is configured to determine, based on the analysis of the one or more configurations, whether the thermal event is likely to occur during the fabrication process automatically in response to the user input to begin the fabrication process.

10. The system of claim 8, further comprising program instructions stored on the at least one non-transitory computer-readable medium that are executable by the at least one processor such that the system is configured to:
- cause (i) an indication of the at least one corrective action and (ii) a selectable option to implement the at least one corrective action to be displayed to a user.

11. The system of claim 8, further comprising program instructions stored on the at least one non-transitory computer-readable medium that are executable by the at least one processor such that the system is configured to:
- automatically implement the at least one corrective action absent user input.

12. The system of claim 1, wherein the program instructions that are executable by the at least one processor such that the system is configured to cause the CNC machine to begin the fabrication process comprise program instructions that are executable by the at least one processor such that the system is configured to cause a motion plan for the fabrication process to be transmitted to the CNC machine; and
- wherein the program instructions that are executable by the at least one processor such that the system is configured to refrain from executing the command to cause the CNC machine to begin the fabrication process comprise program instructions that are executable by the at least one processor such that the system is configured to refrain from causing the motion plan for the fabrication process to be transmitted to the CNC machine.

13. A computer-implemented method, comprising:
- receiving one or more configurations for a fabrication process during which a computer numerically controlled (CNC) machine delivers an electromagnetic energy configured to effect, in a material, one or more changes consistent with one or more designs, the one or more configurations including (i) a design file corresponding to the one or more designs, (ii) one or more characteristics of the material, and (iii) one or more settings of the CNC machine;
- receiving an input indicating a command to cause the CNC machine to begin the fabrication process;
- prior to causing the CNC machine to begin the fabrication process, determining, based on an analysis of the one or more configurations, whether a thermal event is likely to occur during the fabrication process, the thermal event corresponding to one or more regions of the material exhibiting a change that is inconsistent with the one or more designs in response to the electromagnetic energy being delivered to the material, wherein the analysis of the one or more configurations includes performing one or more simulations of the fabrication process to thereby determine a cumulative quantity of energy exposure across the material and/or a quantity of energy exposure across the material at successive points in time during the fabrication process;
- based on determining that a thermal event is not likely to occur during the fabrication process, executing the command to cause the CNC machine to begin the fabrication process; and
- based on determining that a thermal event is likely to occur during the fabrication process, (i) refraining from executing the command to cause the CNC machine to begin the fabrication process and (ii) generating a visual preview of the one or more designs, where the visual preview of the one or more designs shows a predicted final appearance of the material resulting from the CNC machine performing the fabrication process, including a heat map for the design that indicates the one or more regions of the material corresponding to the thermal event.

14. The method of claim 13, further comprising:
- determining at least one corrective action to address the thermal event, wherein the at least one corrective action includes modifying at least one of (i) the design file, (ii) the one or more characteristics of the material, or (iii) the one or more settings of the CNC machine.

15. The method of claim 13, further comprising:
- receiving a user input to begin the fabrication process; and
- wherein determining, based on the analysis of the one or more configurations, whether the thermal event is likely to occur during the fabrication process comprises determining, based on the analysis of the one or more configurations, whether the thermal event is likely to occur during the fabrication process automatically in response to the user input to begin the fabrication process.

16. A non-transitory computer-readable medium, wherein the non-transitory computer-readable medium is provisioned with program instructions that, when executed by at least one processor, cause a system to:

receive one or more configurations for a fabrication process during which a computer numerically controlled (CNC) machine delivers an electromagnetic energy configured to effect, in a material, one or more changes consistent with one or more designs, the one or more configurations including (i) a design file corresponding to the one or more designs, (ii) one or more characteristics of the material, and (iii) one or more settings of the CNC machine;

receive an input indicating a command to cause the CNC machine to begin the fabrication process;

prior to causing the CNC machine to begin the fabrication process, determine, based on an analysis of the one or more configurations, whether a thermal event is likely to occur during the fabrication process, the thermal event corresponding to one or more regions of the material exhibiting a change that is inconsistent with the one or more designs in response to the electromagnetic energy being delivered to the material, wherein the analysis of the one or more configurations includes performing one or more simulations of the fabrication process to thereby determine a cumulative quantity of energy exposure across the material and/or a quantity of energy exposure across the material at successive points in time during the fabrication process;

based on determining that a thermal event is not likely to occur during the fabrication process, execute the command to cause the CNC machine to begin the fabrication process; and based on determining that a thermal event is likely to occur during the fabrication process, (i) refrain from executing the command to cause the CNC machine to begin the fabrication process and (ii) generate a visual preview of the one or more designs, where the visual preview of the one or more designs shows a predicted final appearance of the material resulting from the CNC machine performing the fabrication process, including a heat map for the design that indicates the one or more regions of the material corresponding to the thermal event.

17. The non-transitory computer-readable medium of claim 16, wherein the non-transitory computer-readable medium is also provisioned with program instructions that, when executed by at least one processor, cause the system to:

determine at least one corrective action to address the thermal event, wherein the at least one corrective action includes modifying at least one of (i) the design file, (ii) the one or more characteristics of the material, or (iii) the one or more settings of the CNC machine.

18. The non-transitory computer-readable medium of claim 17, wherein the non-transitory computer-readable medium is also provisioned with program instructions that, when executed by at least one processor, cause the system to:

automatically implement the at least one corrective action absent user input.

* * * * *